(12) United States Patent
Bitar et al.

(10) Patent No.: US 7,733,243 B2
(45) Date of Patent: *Jun. 8, 2010

(54) DEVICE AND METHOD FOR SIGNALING LATERAL MANEUVER MARGINS

(75) Inventors: Elias Bitar, Toulouse (FR); Nicolas Marty, Saint Sauveur (FR)

(73) Assignee: Thales (FR)

( * ) Notice: Subject to any disclaimer, the term of this patent is extended or adjusted under 35 U.S.C. 154(b) by 346 days.

This patent is subject to a terminal disclaimer.

(21) Appl. No.: 11/575,969

(22) PCT Filed: Jul. 4, 2005

(86) PCT No.: PCT/EP2005/053173

§ 371 (c)(1),
(2), (4) Date: Mar. 24, 2007

(87) PCT Pub. No.: WO2006/032549

PCT Pub. Date: Mar. 30, 2006

(65) Prior Publication Data

US 2008/0174454 A1 Jul. 24, 2008

(30) Foreign Application Priority Data

Sep. 24, 2004 (FR) .................................. 04 10149

(51) Int. Cl.
*G08G 5/04* (2006.01)
(52) U.S. Cl. ..................... 340/961; 340/970; 701/14; 701/301
(58) Field of Classification Search ......... 340/945–980; 701/3–14, 301
See application file for complete search history.

(56) References Cited

U.S. PATENT DOCUMENTS 4,646,244 A * 2/1987 Bateman et al. ............. 701/301

(Continued)

FOREIGN PATENT DOCUMENTS

FR          2 842 594 A        1/2004

(Continued)

OTHER PUBLICATIONS

Gunilla Borgefors: "Distance Transformation in Digital Images" Computer Vision, Graphics and Image Processing, vol. 35 pp. 344-378, Feb. 1986.

(Continued)

*Primary Examiner*—Brent Swarthout
(74) *Attorney, Agent, or Firm*—Lowe Hauptman Ham & Berner, LLP

(57) ABSTRACT

The device relates to the signaling, to the pilot of a moving vehicle, for example an aircraft, of its lateral maneuvering margins taking into account obstacles placed in its maneuvering zone. This device determines, over the maneuvering zone of the moving vehicle, the contours of a first type of risk region that must be bypassed and those of two other types of risk region consisting of lateral margins surrounding the first type of risk region, of widths less than separation thresholds or their upper limit considered necessary for a lateral maneuver without space constraint and displays them for the pilot of the moving vehicle. The determination of the separation thresholds takes into account the bearing angle under which a point of the contour of a region of the first type is seen from the moving vehicle.

18 Claims, 13 Drawing Sheets

U.S. PATENT DOCUMENTS

| | | | |
|---|---|---|---|
| 6,021,374 A | 2/2000 | Wood et al. | |
| 6,088,654 A | 7/2000 | Lepere et al. | |
| 6,452,511 B1 * | 9/2002 | Kelly et al. | 340/970 |
| 6,469,664 B1 * | 10/2002 | Michaelson et al. | 342/357.13 |
| 6,675,095 B1 * | 1/2004 | Bird et al. | 701/301 |
| 6,744,382 B1 * | 6/2004 | Lapis et al. | 340/971 |
| 7,330,780 B2 * | 2/2008 | Von Viebahn et al. | 701/3 |
| 2003/0055540 A1 * | 3/2003 | Hansen | 701/3 |
| 2005/0248470 A1 | 11/2005 | Berthe | |
| 2007/0285283 A1 * | 12/2007 | Bitar et al. | 340/963 |

FOREIGN PATENT DOCUMENTS

| | | |
|---|---|---|
| FR | 2842594 B1 | 1/2004 |
| FR | 2 848 662 A | 6/2004 |
| FR | 2864312 A1 | 6/2005 |
| FR | 2871879 A1 | 12/2005 |

OTHER PUBLICATIONS

Per-Erik Danielsson: Euclidian distance mapping, Computer Vision, Graphics and Image Processing, vol. 14 pp. 227-248, 1980.

* cited by examiner

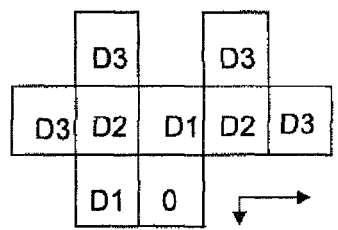
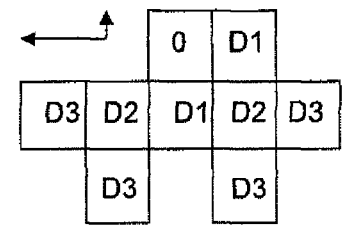
FIG.9a    FIG.9b
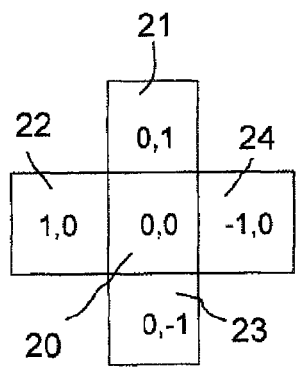
FIG.10
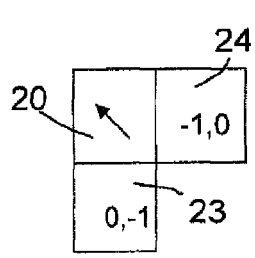
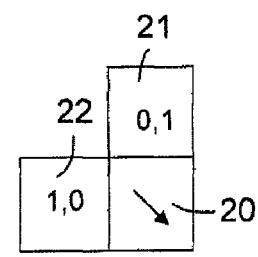
FIG.11a    FIG.11c
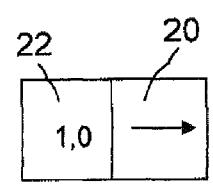
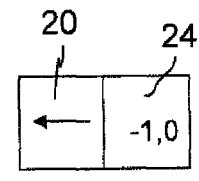
FIG.11b    FIG.11d

STATIC MARGIN     DYNAMIC MARGIN

DEVICE AND METHOD FOR SIGNALING LATERAL MANEUVER MARGINS

CROSS-REFERENCE TO RELATED APPLICATIONS

The present Application is based on International Application No. PCT/EP2005/053173, filed on Jul. 4, 2005, which in turn corresponds to French Application No. 04 10149 filed on Sep. 24, 2004, and priority is hereby claimed under 35 USC §119 based on these applications. Each of these applications are hereby incorporated by reference in their entirety into the present application.

FIELD OF THE INVENTION

The present invention relates to navigation assistance for a moving vehicle subject to maneuverability and path constraints such as a ship or an aircraft maneuvering in or over an expanse having prohibited zones and/or reliefs and obstacles to be bypassed. It more particularly concerns the signaling of the lateral maneuvering margins available to a moving vehicle to maneuver along the contours of zones considered uncrossable.

BACKGROUND OF THE INVENTION

In the aeronautical field, onboard equipment called TAWS systems (Terrain Awareness and Warning Systems) have been developed to warn of the risks of collision with the ground. These TAWS systems provide a short or medium term prediction of the path of the carrier aircraft, based on flight information (position, heading, orientation and amplitude of the speed vector) supplied by the onboard instruments, placing it in a situation relative to a map of the region being flown over extracted from a database of elevations of the terrain and flight prohibition zones, accessible on board and issuing alarms to the crew of the aircraft each time the short or medium term predictable path comes into collision with the ground. Some TAWS systems add to their alarms rudimentary recommendations of the "Terrain Ahead, Pull up" type. Others also give information on the levels of the risks of collision provided by the reliefs, the obstacles and the flight zones prohibited by regulations present in the maneuvering zone of the aircraft, in the form of a map showing the area of the globe being flown over divided into layers of different colors according to the scale of the risk involved.

There is an interest in going further in navigation assistance and signaling to the crew of a moving vehicle, its margin of maneuverability at the boundaries of the zones considered uncrossable.

In the field, the applicant has proposed, in a French patent application FR 2.842.594 filed on 19 Jul. 2002, a system for preventing the risks of collision with the ground for an aircraft, likening the risks of collision with the ground to the penetration of the relief of the zone being flown over into the protection envelope linked to the aircraft, and quantifying them according to the time remaining to undertake an avoidance maneuver. The protection envelopes linked to the aircraft are defined in the horizontal plane, by the surfaces swept by rings with radii greater than that of a predefined avoidance turn, placed, to right and left of the aircraft and offset in front of the aircraft, on its path that can be predicted in the short or medium term. The ground collision risk prevention system quantifies the risks according to the time remaining to the aircraft to undertake, with respect to a relief considered to be threatening, a lateral avoidance maneuver having a point of no-return where the clearance paths by means of a turn corresponding to the pre-established avoidance turn are no longer effective.

The applicant has also proposed, in a French patent application filed on 19 Dec. 2003 under the number 0315020, displaying in the cockpit of an aircraft, a maneuverability map representing the terrain zone being flown over as three types of region: a first type corresponding to the regions to be bypassed as they are considered uncrossable because of the situation and the present performance characteristics of the aircraft, for example, by a TAWS system or even being the subject of a regulatory flight prohibition, a second type corresponding to zones with restricted lateral maneuvering freedom, consisting of the lateral fringes surrounding the regions to be bypassed, of a width corresponding to a minimum width estimated to be necessary to the aircraft to describe, flat and at a safe height, a waiting pattern, and a third type of region complementing the other two types, corresponding to areas with lateral maneuvering freedom. This navigation map, created from a database of elevations of the terrain and of prohibited zones, applies a propagation distance transform for the placement of the external contours of the zones with restricted lateral maneuvering freedom.

The applicant has also proposed, in a French patent application filed on 18 Jun. 2004 under the number 04 06654, a system for signaling narrow passages of the path of a flight plan where the lateral maneuvering freedom of the aircraft is restricted laterally by reliefs or zones that are subject to a regulatory flight prohibition. This signaling system detects the risks of collision with the ground according to the method normally employed by the TAWS systems, which consists in likening the risks of collision with the ground to the penetration of the relief or prohibited zones into protection envelopes linked to the aircraft. In the case of this signaling system, the protection envelopes linked to the aircraft delimit a space considered insufficient to allow the aircraft to perform flat turns that are as tight as is allowed, taking into account the wind.

SUMMARY OF THE INVENTION

It is an object of the present invention is to signal lateral maneuver margins to a moving vehicle, which takes account of the track and the instantaneous position of the moving vehicle, but not its route plan or flight plan, while being as accurate as possible and as undemanding as possible in terms of quantity of calculations.

The present invention is directed to a device, for moving vehicles, for signaling lateral maneuver margins comprising:

means for selecting a maneuvering zone to be considered for the moving vehicle on the surface of the Earth, means for taking into account, in the selected maneuvering zone, a first type of risk region comprising regions considered to be uncrossable, separation threshold generation means for generating at least one horizontal separation threshold to be observed relative to the first type of risk region to claim a complete freedom of lateral maneuver, and means for determining, in the selected maneuvering zone, a second type of risk region made up of regions where the moving vehicle has a restricted lateral maneuvering freedom, said second type of risk region surrounding the first type of risk region over widths at least equal to the separation thresholds established by the separation threshold generation means.

The separation threshold generation means take into account, in the estimation of a separation threshold for a contour point of a region of the first type, the bearing angle of the contour point concerned seen from the moving vehicle.

Advantageously, the separation threshold generation means take into account, in the estimation of a separation threshold for a contour point of a region of the first type, the sine of the bearing angle of the contour point concerned seen from the moving vehicle.

Advantageously, the separation threshold generation means generate separation thresholds comprising at least one distance component corresponding to the length of the projection, on the bearing axis of the contour point concerned relative to the moving vehicle, of an avoidance turn arc of determined diameter.

Advantageously, the separation threshold generation means generate separation thresholds comprising at least one distance component corresponding to the length of the projection, on the bearing axis of the contour point concerned relative to the moving vehicle, of an avoidance turn arc opening to an angle at the center equal to twice the bearing angle of the contour point concerned, limited as an absolute value to a maximum of 180 degrees.

Advantageously, the separation threshold generation means generate separation thresholds comprising at least one distance component corresponding to the length of the projection, on the bearing axis of the contour point concerned relative to the moving vehicle, of an avoidance turn arc opening to an angle at the center equal to the sum of a 90-degree angle and the bearing angle of the contour point concerned, limited as an absolute value to a maximum of 90 degrees.

Advantageously, the separation threshold generation means generate separation thresholds comprising at least one distance component proportional to the product of the radius of an avoidance turn by the sine of the bearing angle of the contour point concerned as seen from the moving vehicle, said bearing angle being taken as an absolute value and limited by upper and lower limits.

Advantageously, the separation threshold generation means generate separation thresholds comprising at least one distance component proportional to the product of the radius of the avoidance turn by the sine of the bearing angle of the contour point concerned as seen from the moving vehicle, said bearing angle being taken as an absolute value and limited to ±90 degrees.

Advantageously, the separation threshold generation means generate separation thresholds comprising at least one distance component proportional to the product of the radius of the avoidance turn by twice the sine of the bearing angle of the contour point concerned as seen from the moving vehicle, said bearing angle being taken as an absolute value and limited to ±90 degrees.

Advantageously, the separation threshold generation means determine a separation threshold by adding, to the length of the projection of said arc on the bearing axis, a drift distance that is a function of the lateral component of the speed of drift of the moving vehicle and of the time that the moving vehicle would take to cover said arc at a set-point speed.

Advantageously, the separation threshold generation means determine a separation threshold by adding a safety distance to the length of the projection of said arc on the bearing axis.

Advantageously, the separation threshold generation means determine, for each contour point of the regions of the first type in direct sight of the moving vehicle, a dynamic separation threshold taking a value increasing with the bearing angle, relative to the moving vehicle, of the contour point concerned.

Advantageously, the separation threshold generation means determine, for each contour point of the regions of the first type in direct sight of the moving vehicle, a dynamic separation threshold taking a value increasing with the bearing angle, relative to the moving vehicle, of the contour point concerned, from a minimum value held constant on a narrow central angular bearing sector that contains the direction of the instantaneous route of the moving vehicle and that is off-center towards the side to which the moving vehicle is turning.

Advantageously, the separation threshold generation means determine, for each contour point of the regions of the first type in direct sight of the moving vehicle, a dynamic separation threshold taking a value increasing with the bearing angle, relative to the moving vehicle, of the contour point concerned, to a limit value reached when the absolute value of the bearing angle exceeds 90 degrees.

Advantageously, the separation threshold generation means determine a static separation threshold valid for all the contour points of the regions of the first type, and taken to be equal to the upper limit of the dynamic thresholds.

Advantageously, the separation threshold generation means determine a static separation threshold valid for all the contour points of the regions of the first type and greater than or equal to the diameter of the avoidance turn.

Advantageously, the device comprises:
 means for selecting a maneuvering zone for the moving vehicle on the surface of the Earth,
 means for taking into account, in the selected maneuvering zone, a first type of risk region made up of regions considered as having to be bypassed,
 lateral separation threshold generation means determining a dynamic separation threshold for each contour point of the regions of the first type in direct sight of the moving vehicle, taking into account the bearing angle of the contour point concerned relative to the moving vehicle and a static separation threshold valid for all the contour points of the regions of the first type, greater than or equal to the diameter of the avoidance turn, said dynamic separation thresholds taking values increasing with the absolute value of the bearing angles to a limit value taken to be equal to the static threshold,
 means for determining, in the selected maneuvering zone, a second type of risk region made up of regions where the moving vehicle has a restricted lateral maneuvering freedom, said second type of risk region extending around the first type of risk region and having, in front of the points of the risk regions of the first type in sight of the moving vehicle, widths at least equal to the dynamic separation thresholds supplied by the separation threshold generation means, and
 means for determining, in the selected maneuvering zone, a third type of risk region made up of regions where the moving vehicle can have a restricted lateral maneuvering freedom, said third type of risk region extending around the first type over a width at least equal to the static separation threshold supplied by the separation threshold generation means.

Advantageously, when the moving vehicle is an aircraft equipped with a TAWS system registering contours of potentially dangerous regions, the means of taking into account the first type of risk region liken the first type of risk region to the regions signaled as dangerous by the TAWS system.

Advantageously, when the moving vehicle is an aircraft, the means of taking into account the first type of risk region liken the first type of risk region to a level cross section of the relief of the selected maneuvering zone, made at a reference altitude taken to be equal to the minimum of the instantaneous altitude of the aircraft and the altitude of the aircraft that can be predicted in the short or medium term.

Advantageously, when the moving vehicle is an aircraft equipped with a TAWS system registering contours of potentially dangerous regions, the means of taking into account the first type of risk region liken the first type of risk region to a level cross section of the relief of the selected maneuvering zone, made at a reference altitude taken to be equal:

if no potentially dangerous regions are signaled by the TAWS system, to at least the instantaneous altitude of the aircraft and the altitude of the aircraft that can be predicted in the short or medium term, and if potentially dangerous regions are signaled by the TAWS system, to at least the instantaneous altitude of the aircraft and the altitude that can be predicted in the short or medium term, with, when the instantaneous vertical speed of the aircraft changes from negative to positive, a re-update of the reference altitude to the value of the altitude of the aircraft that can be predicted in the short or medium term when the latter is greater than the reference altitude.

Advantageously, the device comprises display means showing the selected maneuvering zone in the form of a map of risk zones presenting, in different appearances, the different types of risk region that it takes into account and the part of the selected maneuvering zone that complements these different types.

Another subject of the present invention is a map for signaling lateral maneuver margins obtained by the preceding device, for a moving vehicle of the aircraft type, that is noteworthy in that it displays on a selected maneuvering zone:

a first type of risk region corresponding to a level cross section of the relief of the selected maneuvering zone taken at a reference altitude that is a function of the instantaneous altitude of the aircraft and/or of the altitude of the aircraft that can be predicted in the short or medium term, a second type of risk region by plotting, around the contours of the first type of risk region in direct sight of the aircraft, margins having at each contour point a width at least equal to dynamic separation thresholds, a third type of risk region by plotting, around the first type of risk region, margins with a width at least equal to the static separation threshold, and the regions of the maneuvering zone that complement the first, second and third types of risk region, corresponding to regions of lateral maneuvering freedom for the aircraft.

Another subject of the invention is a method of generating maps for aircraft, signaling lateral maneuvering margins comprising the following steps:

determining a reference altitude for the aircraft, selecting, in a terrain elevation database, elements belonging to a maneuvering zone to be displayed, determining a first type of risk region by selecting, from the elements of the terrain elevation database, retained for display, those whose elevation is greater than or equal to the reference altitude, and complement the regions retained for the first type of risk region with regions that are barred by regulations, the contours of which are taken from a database of prohibited zones, choosing an avoidance turn diameter, generating a dynamic separation threshold from the avoidance turn diameter, the lateral component of the speed of drift of the aircraft and a horizontal safety distance, generating static separation thresholds for the points of the contours of the regions of the first type in direct sight of the aircraft, from the diameter of the avoidance turn, the lateral component of the speed of drift of the aircraft, the bearing angle of the contour point concerned and a horizontal safety distance, estimating the distances separating the points external to the first type of risk region from the contours outside the latter, determining a second type of risk region by plotting, around the contours of the first type of risk region directly in sight of the aircraft, margins having at each contour point a width at least equal to the dynamic separation thresholds, determining a third type of risk region by plotting around the first type of risk region, using estimations of the separation distances, margins of width at least equal to the static separation threshold, and assigning different appearances to the points of the first, second and third types of risk region.

Advantageously, the estimating of the separation distances of the points external to the first type of risk region is done by applying, to the elements from the terrain elevation database and from the prohibited zone database covering the maneuvering zone to be displayed, a chamfer distance transform having the first type of risk region as source points.

Advantageously, the estimating of the separation distances of the points external to the first type of risk region is done by applying, to the elements of the terrain elevation database and the prohibited zone database covering the maneuvering zone to be displayed, a distance vector transform having the first type of risk region as source point.

BRIEF DESCRIPTION OF THE DRAWINGS

Other characteristics and advantages of the invention will become apparent from the description that follows of an exemplary embodiment in the context of a moving vehicle of the aircraft type. This description is given in light of the drawing in which:

FIGS. 9a and 9b show the cells of the chamfer mask illustrated in FIG. 3 that are used in a sweep pass in lexicographic order and in a sweep pass in inverse lexicographic order for the distance propagation with a chamfer mask distance transform, FIG. 10 represents an exemplary mask that can be used by a vector distance transform to estimate the separation distances, FIGS. 11a, 11b, 11c and 11d show the cells of the mask illustrated in FIG. 10 that are used in the various sweep passes for the distance propagation with a vector distance transform.

DETAILED DESCRIPTION OF THE EMBODIMENTS

Signaling lateral maneuvering margins for an aircraft requires, before anything else, a maneuvering zone of the aircraft to be delimited on the surface of the Earth, the map of the delimited maneuvering zone and a registration, on the map obtained, of a first type of risk region made up of regions to be bypassed because they are considered dangerous or prohibited.

The delimiting, on the surface of the Earth, of the extent and the orientation of the maneuvering zone of the aircraft, is obtained, on the one hand, from information concerning the instantaneous position of the aircraft and the modulus and direction of its instantaneous speed vector given by the onboard instruments and, on the other hand, instructions given by the crew of the aircraft.

The map of the zone of the Earth selected is generated from a database of elevations of the terrain and of zones where flight is prohibited by regulations, that is on board or can be consulted from the aircraft. It consists in selecting, in the database, points belonging to the maneuvering zone retained, and in ordering the selected points on a locating grid which is:

- a grid that is regular distance-wise, aligned on the meridians and parallels,
- a grid that is regular distance-wise, aligned on the heading of the aircraft,
- a grid that is regular distance-wise, aligned on the track of the aircraft,
- a grid that is regular angle-wise, aligned on the meridians and parallels,
- a grid that is regular angle-wise, aligned on the heading of the aircraft,
- a grid that is regular angle-wise, aligned on the track of the aircraft,
- a polar representation (radial) centered on the aircraft and its heading,
- a polar representation (radial) centered on the aircraft and its track.

In the description below, a locating grid that is regular distance-wise, aligned on the meridians and parallels, is used, and defined by its north-west ($NW_{LAT}$ and $NW_{LON}$) and south-east ($SE_{LAT}$ $SE_{LON}$) corners with, for angular resolution, $RES_{LAT}$ on the axis of the latitudes and $RES_{LON}$ on the axis of the longitudes.

In the figures, the proportions between the meshes of the locating grid and the surfaces of the various types of risk region are not to scale to improve legibility.

Figure 1:
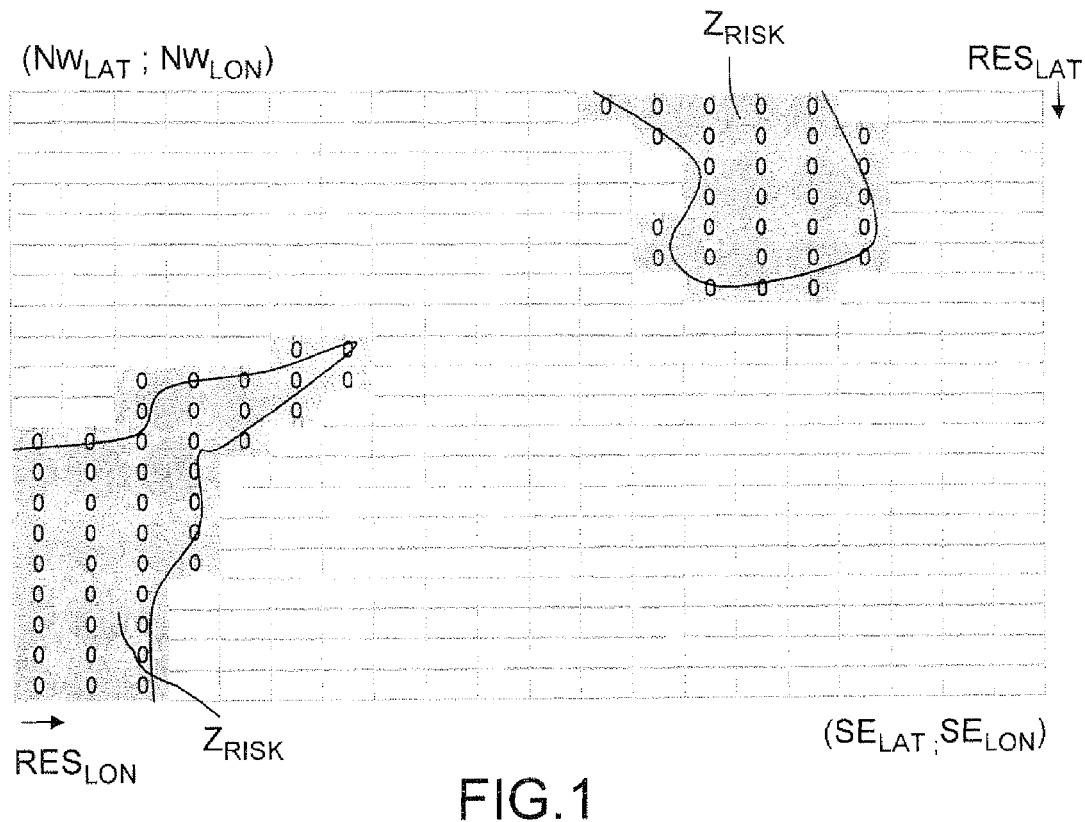
FIG. 1 illustrates an exemplary registration, on a maneuvering zone of an aircraft, of regions belonging to a first type of risk region containing regions to be bypassed.

FIG. 1 shows the registration, on a selected maneuvering zone, of a first type of risk region $Z_{RISK}$ comprising regions that the aircraft must bypass. This registration is done by a marking $Z_{RISK}(i,j)$ of the cells of the mesh of the locating grid belonging to the selected maneuvering zone, taking a value 0 for the cells of the mesh wholly or partly contained in the regions to be bypassed.

The regions to be bypassed $Z_{RISK}$ can be determined by an onboard ground collision risk prevention system of the TAWS type that often likens them to a horizontal level cross section of the relief taken at the altitude of the region closest to the aircraft intercepting a protection volume linked to the aircraft, turned towards the movement of the aircraft and with a bottom vertical profile corresponding to that of the vertical path that the aircraft would follow if, after an arbitrary anticipation time, it were to undertake the maximum climbing gradient allowed by its performance characteristics of the moment.

The regions to be bypassed $Z_{RISK}$ can also be likened to the reliefs of the selected maneuvering zone, exceeding a reference altitude, the regions where flight is prohibited by regulations being artificially assigned an infinite elevation. They are then determined by means of a level cross section taken at the reference altitude in the maneuvering zone retained, this level cross section consisting in selecting from the database those points that belong to the maneuvering zone retained, for which the elevation, real or hypothetical, is greater than the reference altitude.

The reference altitude $RefAlt_n$ determining the regions to be bypassed is dynamically defined from:

- the current flight parameters of the aircraft,
- dynamic vertical safety margins $\Delta_n$, and
- alarms generated by other systems (typically a TAWS).

In the absence of any alarms from a ground collision risk warning system, it can be defined by the relation:

$$RefAlt_n = \min(Alt_n, Alt_n + \Delta_n)$$

n being the current instant, $Alt_n$ being the current altitude of the aircraft, $\Delta_n$ being the predicted altitude variation, for example at 30 seconds, based on the current vertical speed $V_{Zn}$.

Thus, in the absence of an alarm, the reference altitude RefAltn is taken to be equal to the current altitude $Alt_n$ of the aircraft when it has a positive vertical speed $V_{Zn}$ and to the short or medium term predicted altitude $Alt_n + \Delta_n$ when it has a negative or zero vertical speed $V_{Zn}$.

When, at the instant 0, an alarm originating from a ground collision risk warning system appears, the reference altitude can be defined by the relation:

$$RefAlt_0 = \min(Alt_0, Alt_0 + \Delta_0)$$

$ALT_0$ being the altitude of the aircraft at the moment of the alarm, $\Delta_0$ being the predicted altitude variation, according to the alarm, based on the vertical speed of the aircraft $V_{Z0}$ when the alarm appears. For example, for a "Caution" type alarm, $\Delta_0$ is the predicted altitude variation in 20 seconds and for a "Warning" type alarm, $\Delta_0$ is the predicted altitude variation in 8 seconds.

Thus, when a ground collision risk alarm occurs, the reference altitude $RefAlt_0$ is the altitude of the aircraft $Alt_0$ if the aircraft is flying horizontally or climbing and the predictable altitude of the aircraft $Alt_0 + \Delta_0$ if the aircraft is descending.

The update at the current instant n after a ground collision risk alarm follows the following rule:

If the aircraft was flying horizontally or climbing when the alarm appeared ($V_{Z0} \geq 0$), or if the aircraft was descending when the alarm appeared ($V_{Z0} < 0$) but now has a zero or positive vertical speed ($V_{Zn} \geq 0$), the reference altitude $RefAlt_n$ is taken to be equal to the current altitude $Alt_n$ of the aircraft.

If the aircraft was descending when the alarm appeared and still continues to descend, with a current altitude $Alt_n$ greater than the latest update of the reference altitude ($Alt_n > RefAlt_{n-1}$), the reference altitude $RefAlt_n$ is taken to be equal to the maximum of the latest update of the reference altitude $RefAlt_{n-1}$ and the currently predictable altitude for the aircraft $Alt_n + \Delta_n$:

$$RefAlt_n = \max(RefAlt_{n-1}, Alt_n + \Delta n)$$

In the latter case where the aircraft was descending when the alarm appeared and still continues to descend, with a current altitude $Alt_n$ less than or equal to the latest update of the reference altitude ($Alt_n > RefAlt_{n-1}$), the reference altitude $RefAlt_n$ is taken to be equal to the current altitude of the aircraft $Alt_n$.

To claim to be safe, an aircraft needs to observe separation distances relative to the relief in the vertical plane and in the horizontal plane when it is in the vicinity of a region to be bypassed $Z_{RISK}$.

The vertical safe distance can easily be taken into account by adding it to the elevations in the database. The first type of risk region $Z_{RISK}$ is then registered with contours corresponding not to their real contours but to widened contours, the points of which have an elevation corresponding to the reference altitude $RefAlt_n$ minus the vertical safe distance.

The horizontal safe distance is taken into account in determining horizontal separation thresholds relative to the limits of the regions to be bypassed $Z_{RISK}$ giving the aircraft the possibility of undertaking a half-turn by making a flat avoidance turn, to right or to left indifferently, the radius of which is fixed according to the performance characteristics of the aircraft and a required degree of comfort, also taking into account the local wind.

The avoidance turn taken into account for threshold estimations is a flat turn, at constant roll angle SIDE_BANK, traveled with a constant air speed TAS. Its radius R is derived from the conventional relation:

$$R = \frac{TAS^2}{g \times \tan(SIDE\_BANK)} \quad (1)$$

g being the acceleration of gravity.

In practice, to take account of the minimum turn performance levels of an aircraft, a turn radius value SIDE_TURN_RADIUS derived from the above formula (1) corrected in low speeds has been adopted. As shown by the diagram in FIG. 2, this correction consists in imposing a minimum value (RADIUS_MINIMAL) coinciding with the turn radius value obtained for a speed $V_{LIM1}$ corresponding to the stall speed uprated by 30% and a linear transition phase between the speed $V_{LIM1}$ and a slightly greater speed $V_{LIM2}$, at which the values given by the formula (1) are caught up with.

The minimum horizontal separation distance that an aircraft must observe with respect to a contour point in direct sight of the first type of risk region to be bypassed depends on the length of the part of the avoidance path where the aircraft is approaching the contour point, that is, the part of the avoidance path that it must travel to take a route parallel to the tangent to the contour at the point concerned.

Figure 3:
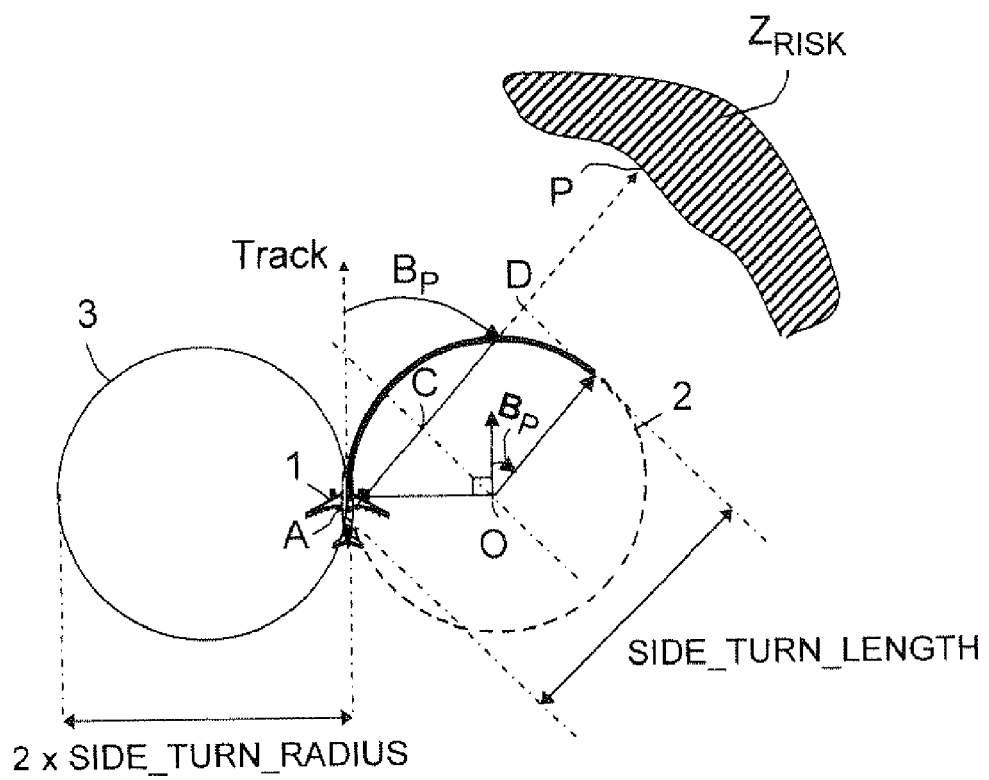
FIG. 3 shows the path concerned for estimating a horizontal separation threshold.

FIG. 3 shows an aircraft 1 passing through a point A, in the vicinity of a zone to be bypassed $Z_{RISK}$, following a track. Two circles 2 and 3 linked to the current position of the aircraft 1, either side of its track, describe two circular avoidance paths 2, 3 corresponding to a flat turn of radius R if local wind is not taken into account.

It can be seen that the length of the part of the avoidance path where the aircraft is approaching approximately corresponds to a quarter-turn on the path of an avoidance turn to the right or to the left, for a point of the contour of a zone to be bypassed $Z_{RISK}$ placed straight in front of the aircraft, therefore with a zero bearing angle, and to a half-turn on the path of an avoidance turn turned towards the contour point concerned, for a point of the contour of a zone to be bypassed $Z_{RISK}$ placed to the side of the aircraft, therefore with a bearing angle of ±90°. Between these two bearing angles, the length of the part of the avoidance path where the aircraft is approaching takes an intermediate value between a quarter- and a half-turn.

To obtain a quarter-turn path, the aircraft needs a horizontal distance margin corresponding to the radius of the avoidance turn. To achieve a half-turn path, it needs a horizontal distance margin corresponding to the diameter of the avoidance turn. To obtain a path between a quarter- and a half-turn, it needs a horizontal distance margin between one and two radii of the avoidance turn.

Estimating this horizontal distance margin amounts to estimating the length of the projection on the normal, at a point P of the contour of a zone to be bypassed $Z_{RISK}$, of the arc of an avoidance turn of radius R or SIDE_TURN_RADIUS traveled by the aircraft, approaching the contour point P concerned. To make this estimation, for simplicity, the normal to the contour of a zone to be bypassed $Z_{RISK}$ at a point P is likened to the bearing axis of this point P seen from the aircraft, which amounts to taking into account, in the definition of a separation threshold relative to a contour point of a region of the first type, the bearing angle of the contour point concerned as seen from the moving vehicle.

The avoidance turn arc for the aircraft no longer to approach a point P at the edge of a zone to be bypassed $Z_{RISK}$ is that opening over an angle at the center equal to the sum of an angle of 90 degrees and of the bearing angle of the contour point concerned limited as an absolute value to a maximum of 90 degrees. The projection on the bearing axis of this avoidance turn arc has a length AD that can be broken down into a length CD equal to an avoidance turn radius R or SIDE_TURN_RADIUS and a length AC equal to the product of the avoidance turn radius R or SIDE_TURN_RADIUS by the sine of an angle equal to the absolute value of the bearing angle concerned limited to 90 degrees. It is possible to deduce from this that a horizontal separation distance threshold for a contour point in direct sight of the aircraft, of a region to be avoided, should present a component as:

$$R \sin|bearing|$$

R being the radius of the avoidance turn, bearing being the bearing angle of the contour point concerned with respect to the track of the aircraft.

The large safe distance margin added to a lateral separation distance threshold allows a certain freedom in the length of the avoidance turn arc taken into account in estimating this threshold.

In a first approach, the avoidance turn arc taken into consideration is the one enabling the aircraft to stop approaching a point P at the edge of a zone to be bypassed $Z_{RISK}$ as has just been defined previously and a dynamic threshold definition $MLCD_{DYNAMIC}$ (MLCD standing for Minimum Lateral Clearance Distance) is deduced from this for each contour point in direct sight of the aircraft, of the first type of risk region, a definition that satisfies the relation:

$$MLCD_{DYNAMIC} = R(1+\sin\lfloor\min(|bearing|,\pi/2)\rfloor)+SIDE\_MLCD_1$$

Figure 2:
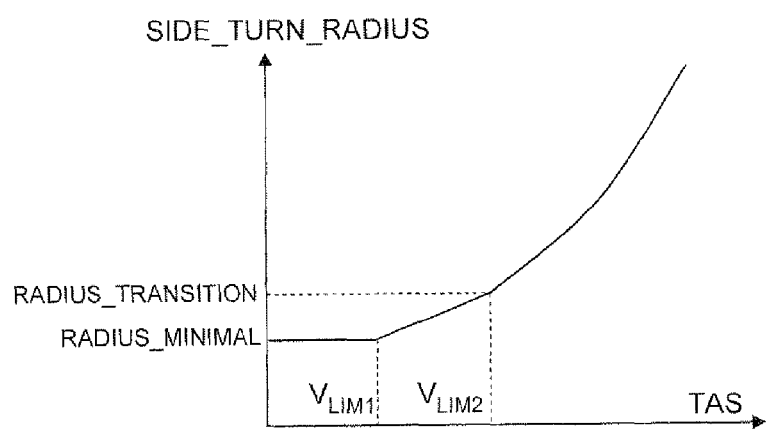
FIG. 2 is a diagram representing the function for defining a lateral avoidance turn radius.

$SIDE\_MLCD_1$ being a constant safety value, or even, taking into account the law for determining the avoidance turn radius described in relation to FIG. 2:

$$MLCD_{DYNAMIC} = SIDE\_TURN\_RADIUS(1+\sin\lfloor\min(|bearing|,\pi/2)\rfloor)+SIDE\_MLCD_1$$

The observance by the aircraft of a separation distance greater than or equal to the upper limit of the dynamic lateral separation thresholds defined previously ensures it a full lateral maneuvering freedom with respect to all the regions to be bypassed. This upper limit, called static lateral separation threshold $MLCD_{STATIC}$ is achieved when the sine of the bearing angle reaches the value 1 such that:

$$MLCD_{STATIC} = 2\times SIDE\_TURN\_RADIUS+SIDE\_MLCD_1$$

As will be seen below, the static lateral separation threshold can be used to roughly delimit, around the regions to be bypassed, the lateral margins needed for lateral maneuvering freedom for the aircraft and the dynamic lateral separation thresholds to delimit more finely these same lateral margins and thus give two alarm levels: one being the one based on the static lateral separation threshold to give the pilot a perception of the lateral distance from the relief and the other being the one based on the dynamic thresholds to warn of a real danger.

In these conditions of the combined use of static and dynamic lateral separation thresholds, there is an interest in reducing and even cancelling out the length of the turn arc taken into account with zero bearing to show the pilot of an aircraft engaged in a corridor that the danger becomes that much greater as the lateral maneuver increases. The lateral separation threshold is then reduced to the safe distance margin. In a second approach, this leads to a second definition of the dynamic threshold $MLCD_{DYNAMIC}$ in which the expression as (1+sine) is replaced by an expression as 2×sine:

$$MLCD_{DYNAMIC} = R(2\sin\lfloor\min(|bearing|,\pi/2)\rfloor)+SIDE\_MLCD_2$$

$SIDE\_MLCD_2$ being a constant safety value, or even, taking into account the law for determining the avoidance turn radius described in relation to FIG. 2:

$$MLCD_{DYNAMIC} = SIDE\_TURN\_RADIUS(2\sin\lfloor\min(|bearing|,\pi/2)\rfloor)+SIDE\_MLCD_2$$

This second definition of the dynamic threshold $MLCD_{DYNAMIC}$ amounts to taking into consideration an avoidance turn arc opening onto an angle at the center equal to twice the bearing angle of the contour point concerned, limited to a maximum of 180 degrees.

The upper limit of the thresholds $MLCD_{DYNAMIC}$ that satisfies this second definition remains the same as previously such that the definition of the static threshold $MLCD_{STATIC}$ remains unchanged.

The estimations of the thresholds $MLCD_{dynamic}$ and $MLCD_{static}$ can be improved to take into account the local wind. To do this, the reporting line is made to include the lateral component $WindSpeed_y$ of the local wind relative to the aircraft in determining the avoidance turn radius, over the time $t_{heading}$ that it takes to travel the part of the path where it is approaching a contour point P in direct sight of a zone to be bypassed. The relations for determining a threshold $MLCD_{DYNAMIC}$ for a given point of a contour in direct sight of a zone to be avoided become, for the first approach:

$$MLCD_{DYNAMIC} = \qquad (2)$$
$$SIDE\_TURN\_RADIUS \times (1+\sin\lfloor\min(|bearing|,\pi/2)\rfloor)+$$
$$WindSpeed_y \times t_{heading} + SIDE\_MLCD_1$$

with $$t_{heading} = \frac{2\pi(90° + [\min(|bearing|,90°)])\times SIDE\_TURN\_RADIUS}{360 \times TAS}$$

and, for the second approach:

$$MLCD_{DYNAMIC} = \qquad (3)$$
$$SIDE\_TURN\_RADIUS \times (2\sin[\min(|bearing|,\pi/2)])+$$
$$WindSpeed_y \times t_{heading} + SIDE\_MLCD_2$$

with $$t_{heading} = \frac{2\pi[\min(2|bearing|,180°)]\times SIDE\_TURN\_RADIUS}{360 \times TAS}$$

As for the relation for determining the threshold $MLCD_{STATIC}$, it becomes:

$$MLCD_{STATIC} = \qquad (4)$$
$$2 \times SIDE\_TURN\_RADIUS + WindSpeed_y \times t_{cap} + SIDE\_MLCD_1$$

with $$t_{heading} = \frac{\pi \, \text{SIDE\_TURN\_RADIUS}}{TAS}$$

In determining a threshold $MLCD_{DYNAMIC}$, it is possible to take into account the influence of the local wind only for the contour points of a zone to be bypassed in direct sight of the aircraft located on the down wind side, which limits the calculations.

It is also possible, to limit the calculations more drastically, to quantify the values of the thresholds $MLCD_{DYNAMIC}$ by giving the same threshold value $MLCD_{DYNAMIC}$ to contour points of zones to be bypassed located in direct sight of the aircraft, within the same bearing range.

Figure 4:
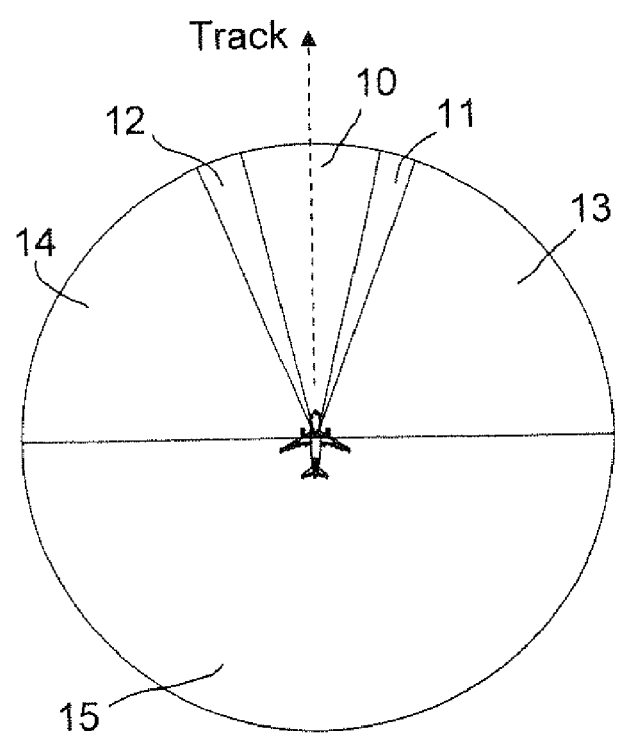
FIG. 4 represents a direction rose of the tracks linked to an aircraft showing a subdivision into angular sectors used to quantify horizontal separation thresholds.

It is possible, for example, as shown in FIG. 4, to divide the direction rose of the tracks of the aircraft into a number of angular segments:

a front angular sector 10 of ±3° bearing relative to the direction of the track of the aircraft, two right and left lateral aperture angular sectors 11, 12, one, 11, covering the 3° to 5° bearing range to the right of the aircraft and the other, 12, the −3° to −5° bearing range to the left of the aircraft, two right and left front angular sectors 13, 14, one, 13, covering the 3° to 90° bearing range to the right of the aircraft and the other, 14, the −3° to −90° bearing range to the left of the aircraft, and a rear angular sector 15 covering the 90° to −90° bearing range to the rear of the aircraft.

Figure 5:
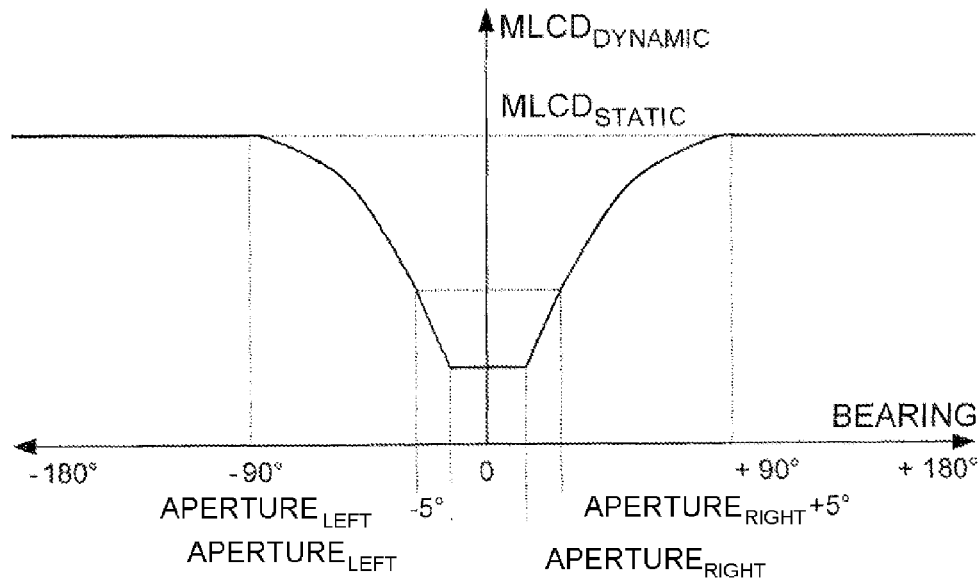
FIG. 5 shows the graph of an exemplary definition of a horizontal separation threshold as a function of a bearing angle.

The law for defining dynamic thresholds $MLCD_{DYNAMIC}$ illustrated in FIG. 5 corresponds to the subdivision of the direction rose of the tracks of the aircraft into angular bearing sectors as represented in FIG. 4.

Any contour point of regions to be bypassed in direct sight of the aircraft within the front angular sector 10 is assigned one and the same minimum threshold value corresponding to a safety margin.

Any contour point of regions to be bypassed in direct sight of the aircraft within the rear sector 15 is assigned one and the same maximum threshold value corresponding to the static threshold $MLCD_{STATIC}$ determined according to the formula (4).

Any contour point of regions to be bypassed in direct sight of the aircraft within the right and left front angular sectors 13, 14 is assigned dynamic threshold values $MLCD_{DYNAMIC}$ determined from the formulae (2) or (3).

Any contour point of regions to be bypassed in direct sight of the aircraft within the right and left lateral aperture angular sectors 11, 12 is assigned dynamic threshold values $MLCD_{DYNAMIC}$ according to a linear progression law ensuring the continuity of the dynamic threshold variations from the minimum threshold value valid for the front sector 10 to the threshold values encountered at the starts of the right and left front angular sectors 13, 14.

Figure 6:
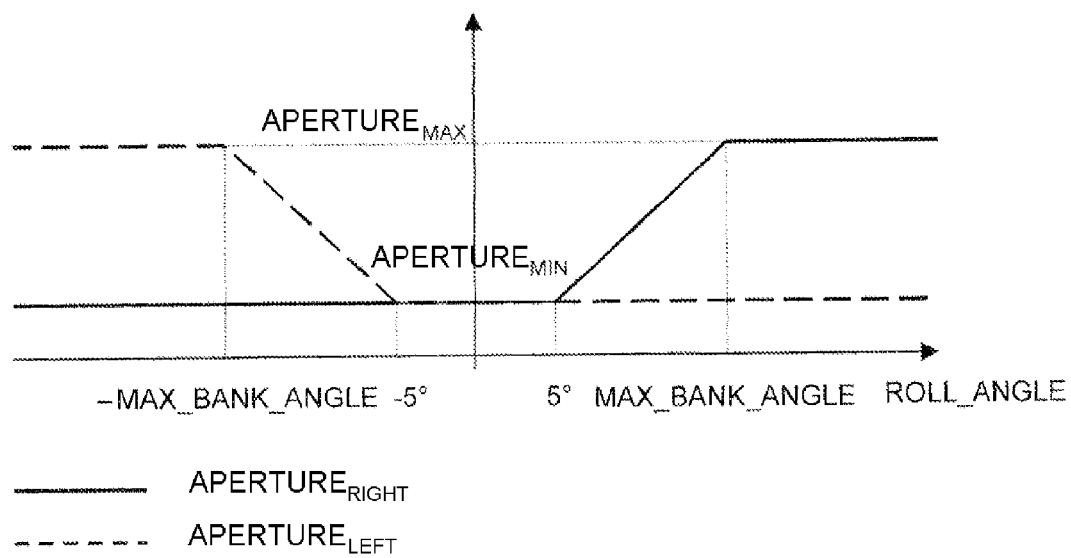
FIG. 6 shows the graph of an exemplary definition of the apertures of angular sectors in a direction rose of the tracks as a function of a roll angle.

As in the case of the TAWS systems, the angular apertures of the angular sectors sharing the direction rose of the tracks of the aircraft are adjusted and offset inside a current turn, for example, by applying the offset law according to the roll of the aircraft, the graph of which is shown in FIG. 6.

In this FIG. 6, the value of the parameter $APERTURE_{MAX}$ is derived from the relation:

$$APERTURE_{MAX} = \frac{g \times \tan(\text{ROLL\_ANGLE})}{TAS} \times \text{REACTION\_DELAY}$$

g being the acceleration of gravity,
ROLL_ANGLE being the roll angle of the aircraft,
TAS being the true air speed of the aircraft,
REACTION_DELAY being a delay covering a latency time of the margin display system due to the calculations to be carried out, a time to place the aircraft in a turn (changing to the required roll angle) and a pilot reaction time.

Figure 7:
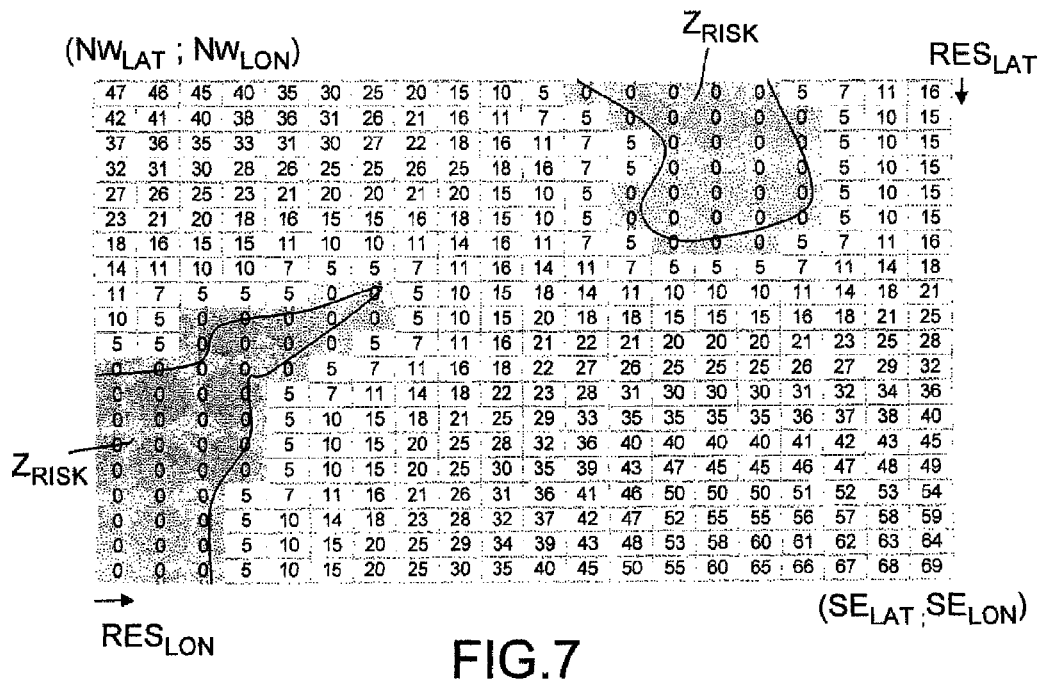
FIG. 7 represents a map for estimating separation distances in relation to the first type of risk region of FIG. 1.

The dynamic and static separation thresholds $MLCD_{DYNAMIC}$ and $MLCD_{STATIC}$, one way of obtaining which has just been explained, are used to plot maneuverability margins around the first type of risk region $Z_{RISK}$. For this use, the map of the first type of risk region of FIG. 1 giving the regions to be bypassed $Z_{RISK}$ is provided, as shown in FIG. 7, with a metric giving the Euclidian separation distances of the points outside the regions to be bypassed $Z_{RISK}$ relative to the contours of the latter. This metric can be obtained in different ways, for example by means of a chamfer distance transform, or a vector distance transform.

The chamfer distance transforms, often called propagation distance transforms, initially appeared in image analysis for estimating distances between objects. Gunilla Borgefors describes examples of them in his article entitled "Distance Transformation in Digital Images", published in the review: Computer Vision, Graphics and Image Processing, Vol. 34 pp. 344-378, February 1986.

The distance between two points of a surface is the minimum length of all the possible paths over the surface starting from one of the points and ending at the other. In an image made up of pixels divided up on a regular mesh of rows, columns and diagonals, a propagation distance transform estimates the distance of a so-called "target" pixel relative to one or more so-called "source" pixels by progressively constructing, starting from the source pixels, the shortest possible path following the mesh of the pixels and culminating at the target pixel, and by making use of the distances found for the pixels of the image already analyzed and a table, called chamfer mask, giving the values of the distances between a pixel and its near neighbors.

Figure 8:
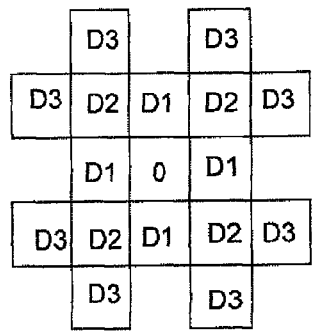
FIG. 8 represents an exemplary chamfer mask that can be used by a propagation distance transform to estimate the separation distances.

As shown in FIG. 8, a chamfer mask takes the form of a table with a cell layout reproducing the pattern of a pixel surrounded by its near neighbors. At the center of this pattern, a cell assigned the value 0 marks the pixel taken as the origin of the distances given in the table. Around this central cell, there are clustered peripheral cells filled with non-zero proximity distance values and reflecting the layout of the pixels neighboring a pixel assumed to occupy the central cell. The proximity distance value given in a peripheral cell is that of the distance separating a pixel occupying the position of the peripheral cell concerned from a pixel occupying the position of the central cell. It will be seen that the proximity distance values are divided up into concentric rings. A first ring of four cells corresponding to the four first rank pixels, which are the nearest to the pixel of the central cell, either on the same line, or on the same column, are assigned a proximity distance value D1. A second ring of four cells corresponding to the four second rank pixels, which are pixels closest to the pixel of the central cell placed on the diagonals, are assigned a proximity distance value D2. A third ring of eight cells corresponding to the eight third rank pixels, which are the closest to the pixel of the central cell while remaining outside the row, column and diagonals occupied by the pixel of the central cell, are assigned a proximity distance value D3.

The chamfer mask can cover a larger or smaller expanse from the pixel of the central cell by giving the values of the proximity distances of a larger or smaller number of concentric rings of neighboring pixels. It can be reduced to the first two rings formed by the neighboring pixels of a pixel occupying the central cell or be extended beyond the first three rings formed by the neighboring pixels of the pixel of the central cell. It is normal to stop at the first three rings as for the chamfer mask shown in FIG. 3.

The proximity distance values D1, D2, D3 which correspond to Euclidian distances are expressed in a scale, the multiplying factor of which allows the use of integer numbers at the cost of a certain approximation. Thus, G. Borgefors adopts a scale corresponding to a multiplication factor of 3 or 5. In the case of a chamfer mask retaining the first two rings of proximity distance values, therefore with dimensions of 3×3, G. Borgefors gives the first proximity distance D1 which corresponds to an x-axis or y-axis scale and also the scale multiplication factor the value 3 and gives the second proximity distance which corresponds to the root of the sum of the squares of the x-axis and y-axis scales $\sqrt{x^2+y^2}$ the value 4. In the case of a chamfer mask retaining the first three rings, therefore with dimensions of 5×5, it gives the distance D1 which corresponds to the scale multiplication factor the value 5, the distance D2 the value 7 which is an approximation of $5\sqrt{2}$, and the distance D3 the value 11 which is an approximation of $5\sqrt{5}$.

The progressive construction of the shortest possible path going to a target pixel starting from source pixels and following the mesh of the pixels is obtained by a regular scanning of the pixels of the image by means of the chamfer mask.

Initially, the pixels of the image are assigned an infinite distance value, in fact a number that is sufficiently high to exceed all the distance values that can be measured in the image, except for the source pixel or pixels that are assigned a zero distance value. Then, the initial distance values assigned to the target points are updated as the image is scanned by the chamfer mask, an update consisting in replacing a distance value assigned to a target point with a new, lesser value resulting from a distance estimation made on a new application of the chamfer mask to the target point concerned.

A distance estimation by applying the chamfer mask to a target pixel consists in listing all the paths going from this target pixel to the source pixel and passing through a pixel neighboring the target pixel, the distance of which has already been estimated during the same scan, in searching among the listed paths for the shortest paths, and in adopting the length of the shortest path or paths as the distance estimation. This is done by placing the target pixel for which the distance is to be estimated in the central cell of the chamfer mask, by selecting the peripheral cells of the chamfer mask corresponding to neighboring pixels, the distance of which has just been updated, in calculating the lengths of the shortest paths linking the target pixel to be updated to the source pixels, passing through one of the selected neighboring pixels, by adding the distance value assigned to the neighboring pixel concerned and the proximity distance value given by the chamfer mask, and in adopting, as the distance estimation, the minimum of the path length values obtained and of the old distance value assigned to the pixel currently being analyzed.

On a pixel being analyzed by the chamfer mask, the progressive search for the shortest possible paths starting from a source pixel and going to the various target pixels of the image gives rise to a phenomenon of propagation towards the pixels that are the nearest neighbors to the pixel being analyzed and whose distances are given in the chamfer mask. In the case of a regular distribution of the pixels of the image, the directions of the nearest neighbors of a pixel that do not vary are considered as propagation axes of the chamfer distance transform.

The order in which the pixels of the image are scanned affects the reliability of the distance estimations and their updates, because the paths taken into account depend on this. In fact, it is subject to a regularity constraint whereby, if the pixels of the image are registered in lexicographic order (pixels arranged in ascending order row by row, starting from the top of the image and working towards the bottom of the image, and from left to right within a row), and if a pixel p has been analyzed before a pixel q, then a pixel p+x must be analyzed before the pixel q+x. The lexicographic, inverse lexicographic (scanning of the pixels of the image row by row from bottom to top and, within a row, from right to left), transposed lexicographic (scanning the pixels of the image column by column from left to right and, within a column, from top to bottom), inverse transposed lexicographic (scanning the pixels in columns from right to left and, within a column, from bottom to top) orders satisfy this regularity condition and, more generally, all the scans in which the rows and columns are scanned from right to left or from left to right. G. Borgefors recommends a double scan of the pixels of the image, once in the lexicographic order and again in the inverse lexicographic order.

The analysis of the image by means of the chamfer mask can be done using a parallel method or a sequential method. For the parallel method, the distance propagations considered are those from all the points of the mask that are applied to the whole of the image in several scans until no further changes to the distance estimations occur. For the sequential method, the distance propagations considered are only those from half the points of the mask. The top half of the mask is applied to all the points of the image by a scan in lexicographic order then the bottom half of the mask is applied to all the points of the image in inverse lexicographic order.

FIG. 9a shows, in the case of the sequential method and of a scan pass in lexicographic order going from the top left corner to the bottom right corner of the image, the cells of the chamfer mask of FIG. 3 used to give the paths going from a target pixel placed in the central cell (cell indexed 0) to the source pixel, passing through a neighboring pixel, the distance of which has already been the subject of an estimation during the same scan. There are eight of these cells, positioned in the top left part of the chamfer mask. There are therefore eight paths given for the search for the shortest, the length of which is taken for the distance estimation.

FIG. 9b shows, in the case of the sequential method and of a scan pass in inverse lexicographic order going from the bottom right corner to the top left corner of the image, the cells of the chamfer mask of FIG. 3 used to give the paths going from a target pixel placed in the central cell (cell indexed 0) to the source pixel, passing through a neighboring pixel, the distance of which has already been the subject of an estimation during the same scan. These cells complement those of FIG. 4a. There are also eight of them, but arranged in the bottom right part of the chamfer mask. There are therefore again eight paths given for the search for the shortest, the length of which is taken for the distance estimation.

The propagation distance transform, the principle of which has just been briefly reviewed, was originally designed for analyzing the positioning of objects in an image, but it was soon applied to estimating distances on a map of the relief, taken from a terrain elevation database with regular mesh, of the earth's surface. In practice, such a map does not explicitly have a metric since it is plotted based on the elevations of the points of the mesh in the terrain elevation database of the zone represented. In this context, the propagation distance transform is applied to an image whose pixels are the elements of the terrain elevation database that belong to the map, that is, elevation values associated with the latitude and longitude geographic coordinates of the nodes of the mesh where they have been measured, classified, as on the map, by ascending or descending latitude or longitude according to a two-dimensional table of latitude and longitude coordinates.

To obtain, in a map of a maneuvering zone, separation distances for points outside of regions to be bypassed relative to the contours of these regions to be bypassed, the zones to be bypassed are considered as objects when applying a chamfer distance transform, all their points being considered as source points. The scans of the map by the chamfer mask lead to the selection, for the distance estimations, of paths developing dendritically towards the target points, along normals to the contours of the regions to be bypassed.

Another distance transform that can be used to estimate separation distances is the vector distance transform, also called signed Euclidian distance transform. Per-Erik Danielsson describes examples of this in an article entitled "Euclidian distance mapping", Computer Vision, Graphics and Image Processing, Vol. 14 pp. 227-248, 1980.

This vector distance transform is based on the fact that the location of a pixel can be deduced from the locations of its nearest neighbors. It takes up the principle of a chamfer distance transform, but with a mask consisting of a table containing the components, in units of axes of the reference registration, (x-axis and y-axis in the 2D case) of the distances separating the pixel being analyzed placed at the center of the mask from the pixels that are its nearest neighbors, distances that are oriented towards the pixel being analyzed. Each pixel of an image subjected to a vector distance transform is assigned components of a location vector. On initialization, these components are zero for the source pixels that are the origin of the distance measurements and raised to maximum values for the others. When the mask is applied to a pixel being analyzed, the location vector of this pixel has its length ($\sqrt{x^2+y^2}$ in the 2D case) compared to the lengths of new location vectors deduced from the location vectors of the neighboring pixels covered by the mask and of the oriented distance components given in the mask, and replaced by a new location vector if the latter is of lesser length.

As for a chamfer mask, a vector distance transform mask can be of large or small size and the propagation of the location vectors imposes conditions on the directions of movement of the mask when an image is scanned. The benefit of the vector distance transform lies in the fact that the error on the distance estimations obtained is limited. In practice, there is no distance approximation made in the mask and the errors originate only from a wrong propagation.

FIG. 10 gives an exemplary mask for a vector distance transform reduced to the first ring of four cells corresponding to the four first rank pixels, which are nearest to the pixel of the central cell, either on the same row, or on the same column. This mask takes the form of a table with a cell layout reproducing the pattern of a pixel surrounded by its near neighbors. At the center of the pattern, a cell 20 assigned the value 0,0 marks the pixel taken for the origin of the distances given in the table. Around this central cell are clustered peripheral cells 21, 22, 23, 24 which reflect the layout of the neighboring pixels of a pixel assumed to occupy the central cell. Each of these peripheral cells indicates the quantity: 0, +1, −1 to be added to the components of the location vector that are assigned to a neighboring pixel to take account of the movement to the pixel being analyzed in a reference fix with orthogonally oriented axes parallel to the rows and columns of pixels. To have a correct propagation of the location vectors, the mask can be moved on the image, in both directions, in two scan directions: the horizontal direction and the direction of a diagonal of the image. Each time, only some of the cells of the mask are used. For a scan in the upward diagonal direction (FIG. 11a), only the bottom cell 23 and the right side cell 24 are used. For a horizontal scan from left to right (FIG. 11b), only the left side cell 22 is used. For a scan in the downward diagonal direction (FIG. 11c), only the top cell 21 and the left side cell 22 are used. For a horizontal scan from right to left (FIG. 11d), only the right side cell 24 is used.

Figure 12:
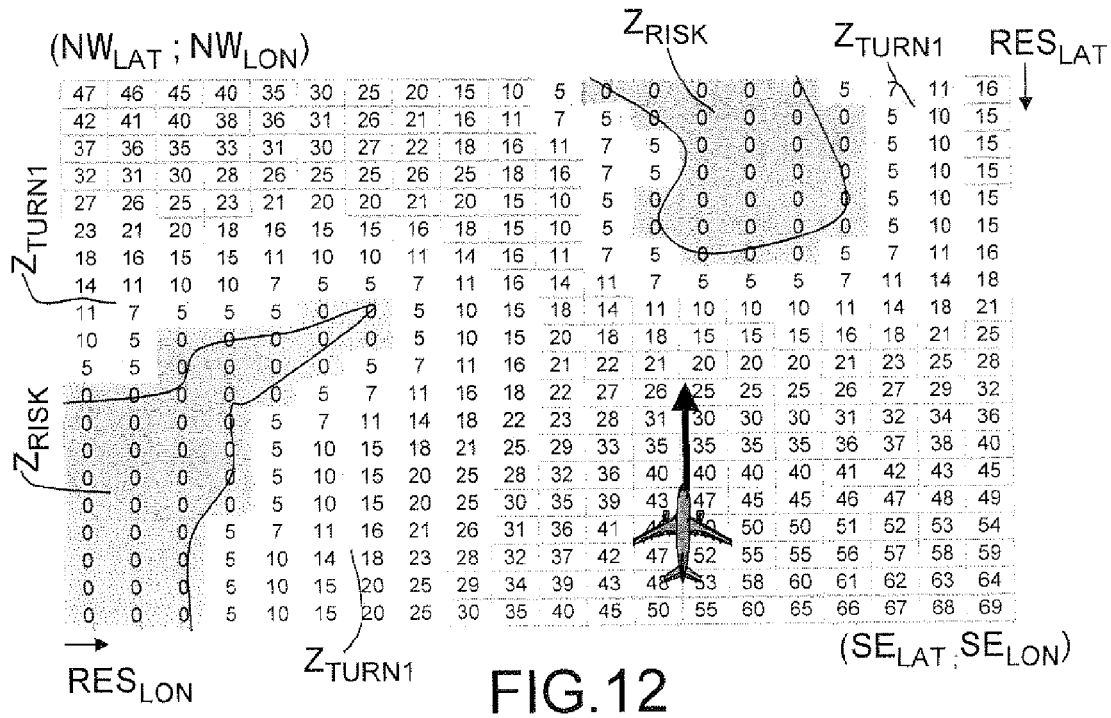
FIG. 12 illustrates an exemplary registration, on the same maneuvering zone as FIGS. 1 and 7, of a second type of risk region, at the margin of the first type of risk region, where the aircraft has its lateral maneuvering freedom limited by the proximity of the first type of risk region, this second type of risk region having a lateral separation in relation to the first type of risk region less than the separation thresholds, called dynamic thresholds.

FIG. 12 shows, in the same maneuvering zone as FIGS. 1 and 7, a second type of risk region $Z_{TURN1}$ added to the first type of risk region $Z_{RISK}$. This second type of risk region $Z_{TURN1}$ represented in a lighter shading than the risk regions of the first type $Z_{RISK}$ is made up of regions close to the risk regions of the first type $Z_{RISK}$ where the aircraft has very limited lateral maneuvering freedom because their cells do not observe the dynamic lateral separation thresholds $MLCD_{DYNAMIC}$ assumed here to cover a range of values from 7 to 27.

Figure 13:
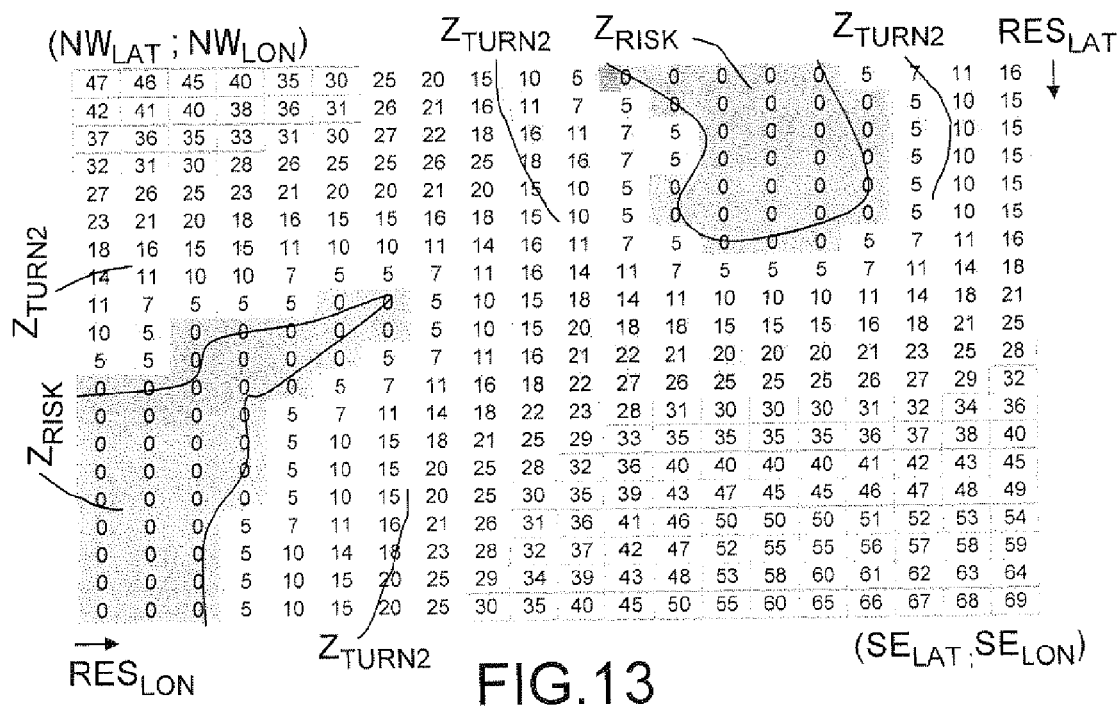
FIG. 13 illustrates an exemplary registration, on the same maneuvering zone as in FIGS. 1, 7 and 12, of a third type of risk region at the margin of the first type of risk region, more extensive than the second type of risk region but less restrictive for lateral maneuvering freedom, this third type of risk region having a lateral separation in relation to the first type of risk region less than a lateral separation threshold, called static threshold, greater than the dynamic thresholds.

FIG. 13 shows, in the same maneuvering zone as FIGS. 1 and 7, a third type of risk region $Z_{TURN2}$ added to the first type of risk region $Z_{RISK}$. This third type of risk region $Z_{TURN2}$ represented in a lighter shading than the risk regions of the first type $Z_{RISK}$ is made up of regions close to the risk regions of the first type $Z_{RISK}$ where the aircraft has a relatively limited lateral maneuvering freedom because their cells do not observe the static lateral separation threshold $MLCD_{STATIC}$ which is assumed here, with the assumptions made on the range of values of the dynamic lateral separation thresholds $MLCD_{DYNAMIC}$, to have a value of 27.

Figure 14:
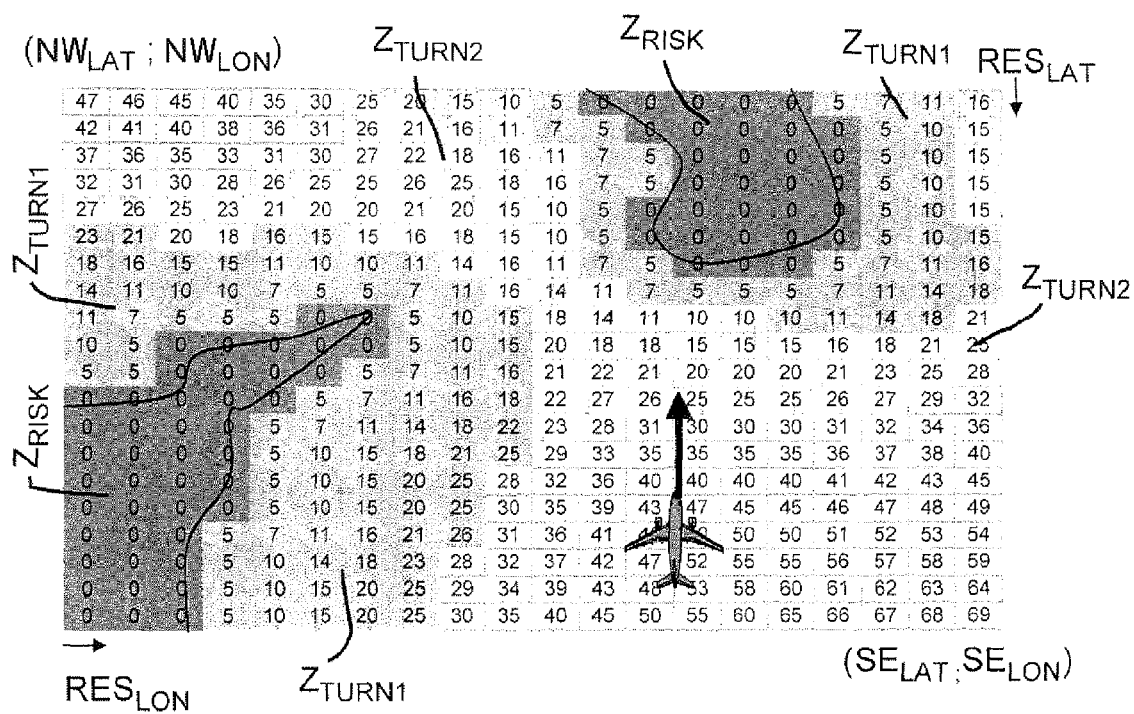
FIG. 14 illustrates an example of overlaid registrations, on the same maneuvering zone as FIG. 1, of the first, second and third types of risk region shown in FIGS. 1, 12 and 13.

FIG. 14 shows, in the same maneuvering zone as the preceding FIGS. 1, 7, 12 and 13, a merged map of the three types of risk region. It should be noted that the definitions adopted for the dynamic and static lateral separation thresholds $MLCD_{DYNAMIC}$ and $MLCD_{STATIC}$, require the regions of the second type $Z_{TURN1}$ delimited based on the dynamic thresholds $MLCD_{DYNAMIC}$ to be included in the regions of the third type $Z_{TURN2}$ delimited based on the static threshold $MLCD_{STATIC}$ and the limits of the contours of the regions of the second and third types $Z_{TURN1}$ and $Z_{TURN2}$ to be merged on the path of the aircraft.

The three types of risk region $Z_{RISK}$, $Z_{TURN1}$, $Z_{TURN2}$, which have just been determined in the selected maneuvering zone and which inform as to the lateral dangers, can be presented on a navigation screen on the dashboard of the aircraft, in addition to or in place of a THD (Terrain Hazard Display) map, displayed by a ground collision risk prevention system of the TAWS type for example.

Figure 15:
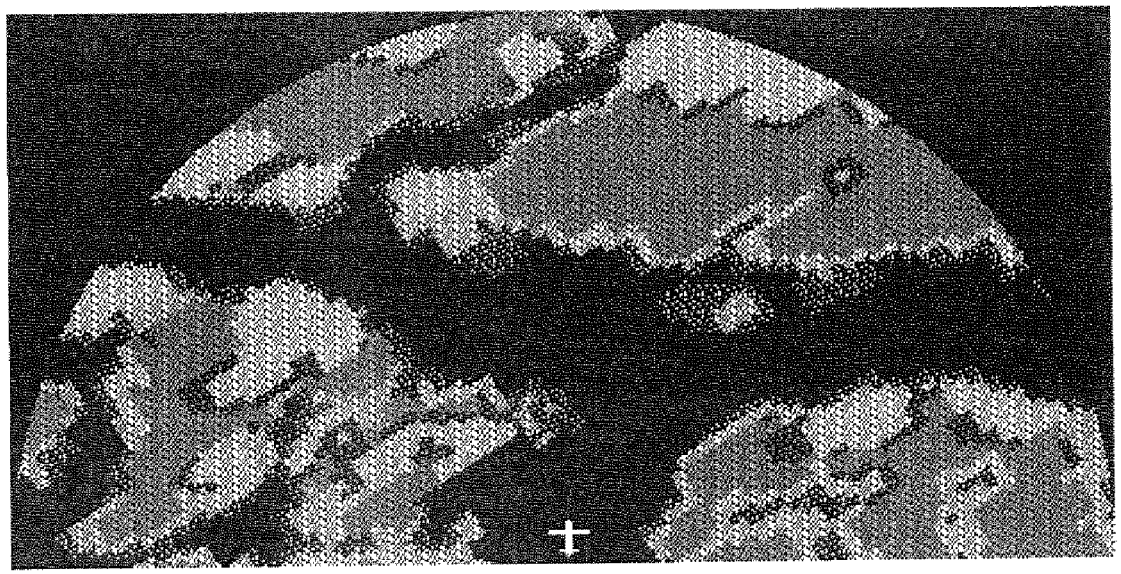
FIG. 15 shows an exemplary display, on a navigation screen, of a ground collision risk map originating from a ground collision risk prevention system.

When the three types of risk region are presented in addition to a THD map, the first type of risk region considered as to be bypassed $Z_{RISK}$ is already part of the THD map. It normally comprises a horizontal cross section of the terrain being flown over taken at a reference level corresponding to the altitude of the aircraft minus a safety margin, a cross section to which are added the contours of the areas for which overflight is prohibited by the regulations. Sometimes, the shapes of the regions to be bypassed of the first type $Z_{RISK}$ are detailed more finely by additional level cross sections. The THD map of FIG. 15 details the shape of the regions to be bypassed of the first type $Z_{RISK}$ by means of a level cross section close to the reference altitude and two other level cross sections 500 and 1500 feet above the reference altitude. It also details the regions in which flight is possible by three level cross sections at 500, 100 and 1500 feet below the reference altitude of the aircraft.

Figure 16:
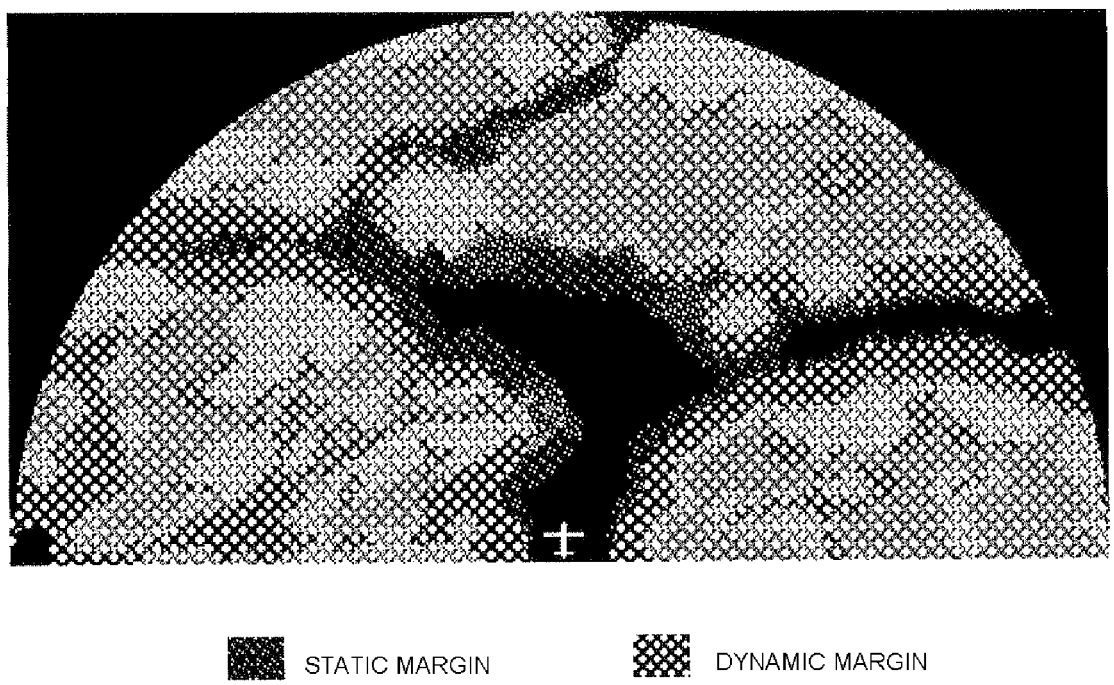
FIGS. 16 and 17 show the modification made to the ground collision risk map of FIG. 15 by the addition of the super-texture or sub-texture representation of the second and third types of risk region where the aircraft has a restricted lateral maneuvering freedom.
Figure 16:
Figure 16:
Figure 17:
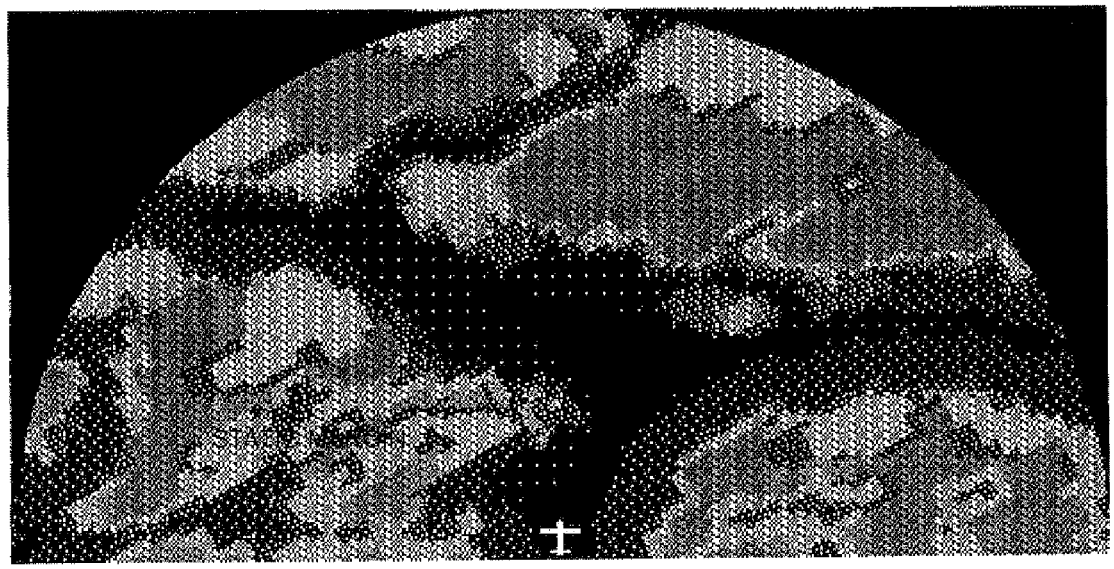
Figure 18:
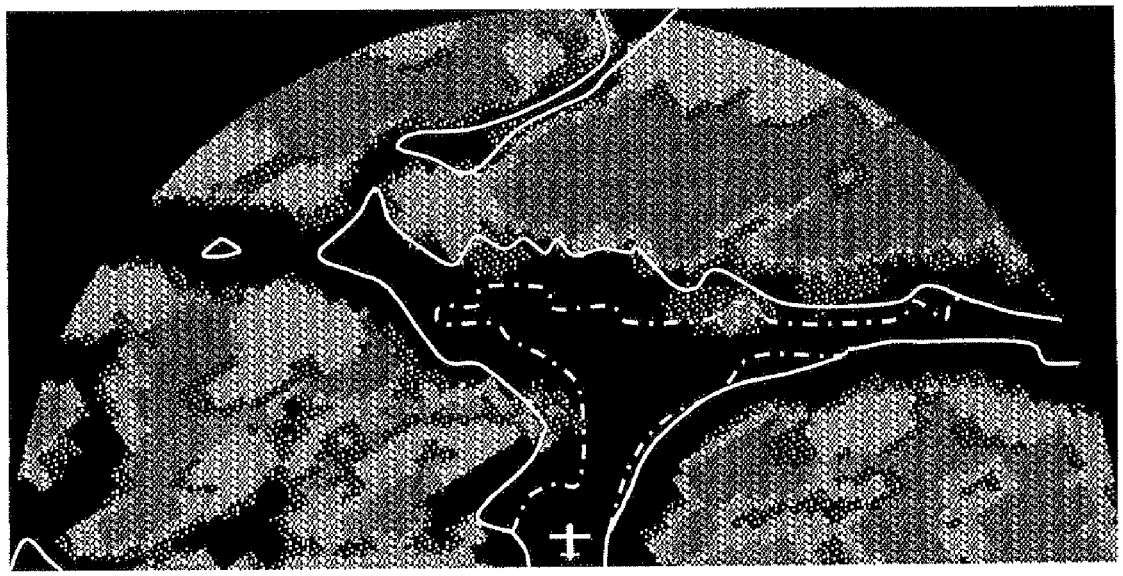
FIG. 18 shows the modification made to the ground collision risk map of FIG. 15 by the addition of the representation of the contour lines of the second and third types of risk region where the aircraft has a restricted lateral maneuvering freedom.
Figure 18:
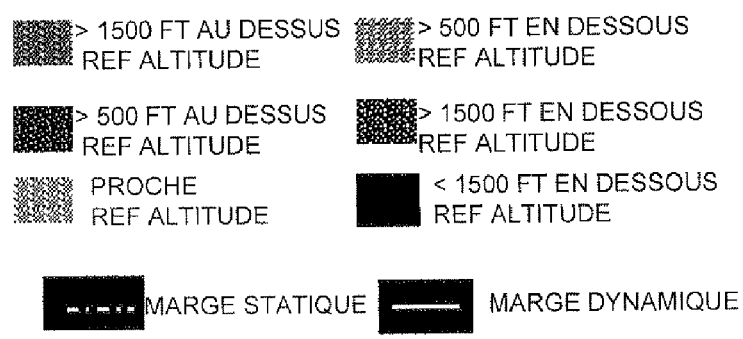

The two types of risk regions $Z_{TURN1}$ and $Z_{TURN2}$ in which the aircraft has more or less limited lateral maneuvering freedom can be represented on a THD map by super-textures (FIG. 16), by sub-textures (FIG. 17) or by contour lines (FIG. 18). The super-textures cover the first type of risk region $Z_{RISK}$ to be bypassed and overlap the regions where flight is possible whereas the sub-textures appear only at the edge of the regions in which flight is possible. The second type of risk region $Z_{TURN1}$ corresponding to the dynamic lateral separation thresholds $MLCD_{DYNAMIC}$, being more constraining in terms of safety than the third type of risk region $Z_{TURN2}$ corresponding to the static lateral separation threshold $MLCD_{STATIC}$, is assigned a denser texture.

An additional symbol, for example a ring around the aircraft, can be displayed to make more apparent the position of the aircraft relative to the external boundaries of the second and third types of risk regions $Z_{TURN1}$ and $Z_{TURN2}$ forming the lateral margins which are necessary for its maneuvering freedom.

Figure 19:
FIG. 19 shows an exemplary display, on a navigation screen, of a lateral collision risk map showing the first type of risk region made up of the regions to be bypassed and the second and third type of risk region where the aircraft has a restricted lateral maneuvering freedom.

Used in place of a THD map, the three types of risk region $Z_{RISK}$, $Z_{TURN1}$ and $Z_{TURN2}$ can be used to display a lateral danger map (called LHD, standing for "Lateral Hazard Display"). FIG. 19 shows such a display. In this figure, the first type of risk region $Z_{RISK}$ corresponding to the regions to be bypassed, that is, with a level cross section of the relief of the selected maneuvering zone taken at a determined reference altitude in the way described previously and complemented by the contours of the regions subject to a flight prohibition regulation, is shown in white with no texture. The second type of risk region $Z_{TURN1}$ corresponding to the margins surrounding the first type of risk region $Z_{RISK}$, with widths less than the dynamic lateral separation thresholds $MLCD_{DYNAMIC}$, at the various contour points of the first type of risk region $Z_{RISK}$ in direct view of the aircraft, is shown in a dark texture dotted uniformly with a not very dense pattern of light dots. The third type of risk region $Z_{TURN2}$ corresponding to the margins surrounding the first type of risk region $Z_{RISK}$, with a width less than the static lateral separation threshold $MLCD_{STATIC}$, is shown in a dark color dotted uniformly with dense light dots.

As a variant, the three types of risk region $Z_{RISK}$, $Z_{TURN1}$ and $Z_{TURN2}$, can be represented by colors dependent on the risk level, for example, a red color for the first type of risk region $Z_{RISK}$ which constitutes a high risk because it has to be bypassed, a faded yellow color for the second type of risk region $Z_{TURN1}$ which constitutes a low risk because it indicates only that the upper limit of the dynamic lateral separation thresholds is no longer observed, a deep yellow color for the third type of risk region $Z_{TURN2}$ which constitutes a medium risk given that the dynamic lateral separation thresholds are no longer respected and a green color for the rest of the points of the map with a zero risk level. It provides a way of confirming the pilot of the aircraft in his mental assessment of the flat turn radii that are accessible to the aircraft taking into account the local wind.

The display of a THD map complemented by the three types of risk region $Z_{RISK}$, $Z_{TURN1}$ and $Z_{TURN2}$ or of the LHD map can be accompanied by audible or visual alarms indicating to the crew of the aircraft greater or lesser restrictions on its maneuvering freedom and specifying the side and, where appropriate, the bearing angle from which the greatest threat originates.

Figure 20:
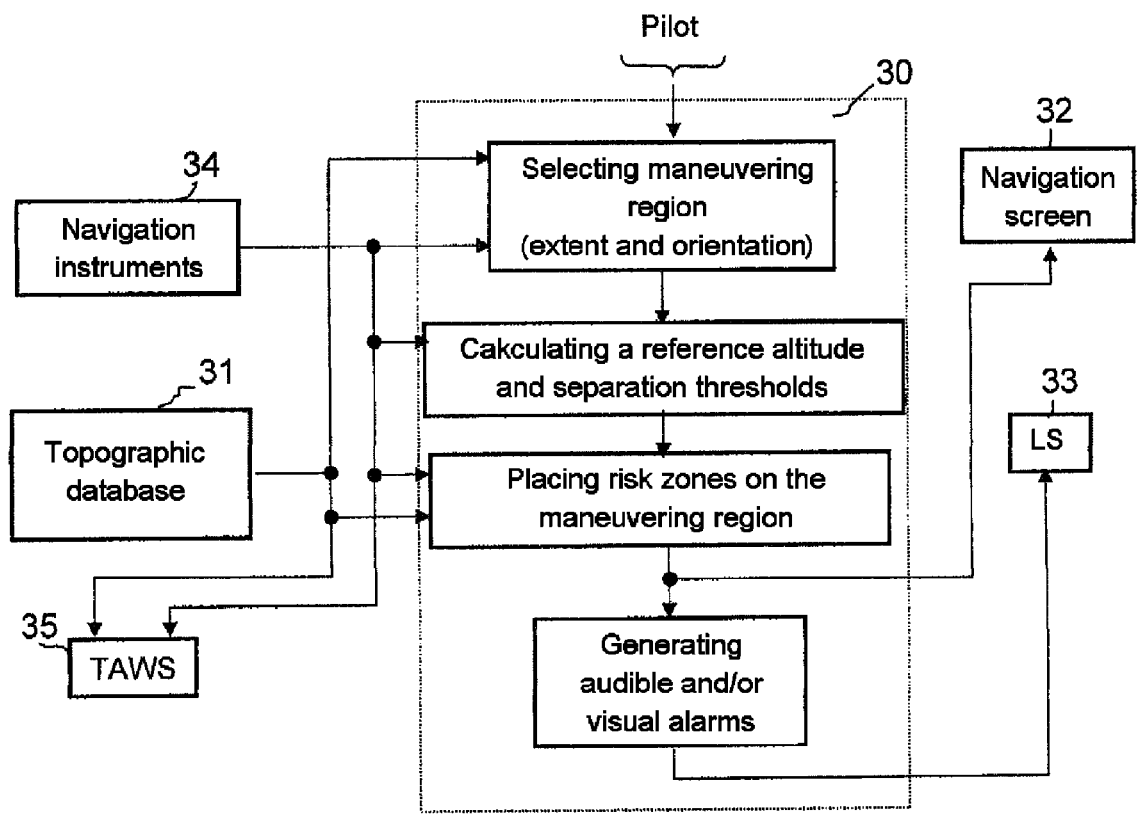
FIG. 20 shows a diagram of a device according to the invention, for signaling risk of lateral collision with the ground.

FIG. 20 shows a risk signaling device in its operational environment on board an aircraft. The risk signaling device mainly comprises a computer 30 associated with a database of terrain elevations and of flight prohibition zones 31 and with visual 32 and audible 33 display devices. The database of terrain elevations and of flight prohibition zones 31 is represented as being on board the aircraft, but it can equally be located on the ground and accessible from the aircraft by radio transmission. The computer 30 can be a computer dedicated to generating risk indications caused by the proximity of the relief or flight prohibition zones to be bypassed in the maneuvering zone of the aircraft or a computer shared with other tasks such as flight management or the automatic pilot. Regarding the risk signaling, it receives from the navigation instruments 34 of the aircraft, the main flight parameters including the position of the aircraft in latitude, longitude and altitude, and the direction and amplitude of its speed vector. Based on these flight parameters and any instructions originating from the pilot of the aircraft, it determines at each instant:

the position on the surface of the Earth, the orientation and the dimensions of a maneuvering zone where to look for the various types of risk region and any flight prohibition zones, a reference altitude, and dynamic and static lateral separation thresholds.

Based on the information from the database of terrain elevations and of flight prohibition zones 31, it extracts a locating grid mapping the selected maneuvering zone. It then places on this locating grid:

the contours of the first type of risk regions $Z_{RISK}$ that it receives from a TAWS instrument 35 where that it determines based on a cross section of the relief taken at the reference altitude and complemented by the contours of the flight prohibition zones, the contours of the second type of risk region that it determines by means, on the one hand, of a separation distance map relative to the first type of risk region, created, for example, using a distance transform and, on the other hand, the static lateral separation threshold, the contours of the third type of risk region that it determines by means of the separation distance map and the dynamic lateral separation thresholds.

Once these different zones have been placed on the locating grid, it generates an image representing them that can be displayed on a screen 36 of the cockpit, for example the navigation screen ND and, if the aircraft penetrates into the second or third type of risk region $Z_{TURN1}$ or $Z_{TURN2}$, it issues an audible or visual alarm specifying the lateral maneuverability limitation level and, where appropriate, the bearing, relative to the aircraft, of the contour point or points of the region of the first type causing the limitation.

What is claimed is:

1. A device, for moving vehicles, for signaling lateral maneuver margins comprising:

means for selecting a maneuvering zone on the surface of the Earth, means for taking into account, in the selected maneuvering zone, a first type of risk region comprising regions considered to be uncrossable, separation threshold generation means for generating at least one horizontal separation threshold to be observed relative to the first type of risk region to claim a complete freedom of lateral maneuver, said separation threshold generation means taking into account, in the estimation of a separation threshold for a contour point of a region of the first type, the bearing angle of the contour point concerned seen from the moving vehicle, and means of determining, in the selected maneuvering zone, a second type of risk region made up of regions where the moving vehicle has a restricted lateral maneuvering freedom, said second type of risk region surrounding the first type of risk region over widths at least equal to the separation threshold established by the separation threshold generation means wherein the separation threshold generation means take into account, in the estimation of a separation threshold for a contour point of a region of the first type, the sine of the bearing angle of the contour point concerned seen from the moving vehicle.

2. A device, for moving vehicles, for signaling lateral maneuver margins comprising:

means for selecting a maneuvering zone on the surface of the Earth, means for taking into account, in the selected maneuvering zone, a first type of risk region comprising regions considered to be uncrossable, separation threshold generation means for generating at least one horizontal separation threshold to be observed relative to the first type of risk region to claim a complete freedom of lateral maneuver, said separation threshold generation means taking into account, in the estimation of a separation threshold for a contour point of a region of the first type, the bearing angle of the contour point concerned seen from the moving vehicle, and means of determining, in the selected maneuvering zone, a second type of risk region made up of regions where the moving vehicle has a restricted lateral maneuvering freedom, said second type of risk region surrounding the first type of risk region over widths at least equal to the separation threshold established by the separation threshold generation means, wherein the separation threshold generation means generate separation thresholds includes at least one distance component corresponding to the length of the projection, on the bearing axis of the contour point concerned relative to the moving vehicle, of an avoidance turn arc of determined diameter.

3. The device as claimed in claim 2, wherein the separation threshold generation means generate separation thresholds ($MLCD_{DYNAMIC}$) includes at least one distance component corresponding to the length of the projection, on the bearing axis of the contour point concerned relative to the moving vehicle, of an avoidance turn arc opening to an angle at the center equal to twice the bearing angle of the contour point concerned, limited as an absolute value to a maximum of 180 degrees.

4. The device as claimed in claim 2, wherein the separation threshold generation means generate separation thresholds includes at least one distance component corresponding to the length of the projection, on the bearing axis of the contour point concerned relative to the moving vehicle, of an avoidance turn arc opening to an angle at the center equal to the sum of a 90-degree angle and the bearing angle of the contour point concerned, limited as an absolute value to a maximum of 90 degrees.

5. The device as claimed in claim 1, wherein the separation threshold generation means generate separation thresholds includes at least one distance component proportional to the product of the radius of an avoidance turn by the sine of the bearing angle of the contour point concerned as seen from the moving vehicle, said bearing angle being taken as an absolute value and limited by upper and lower limits.

6. The device as claimed in claim 5, wherein the separation threshold generation means generate separation thresholds includes at least one distance component proportional to the product of the radius of the avoidance turn by the sine of the bearing angle of the contour point concerned as seen from the moving vehicle, said bearing angle being taken as an absolute value and limited to ±90 degrees.

7. The device as claimed in claim 1, wherein the separation threshold generation means generate separation thresholds includes at least one distance component proportional to the product of the radius of the avoidance turn by twice the sine of the bearing angle of the contour point concerned as seen from the moving vehicle, said bearing angle being taken as an absolute value and limited to ±90 degrees.

8. The device as claimed in claim 2, wherein the separation threshold generation means determine a dynamic separation threshold ($MLCD_{DYNAMIC}$) by adding, to the length of the projection (AD) of the avoidance turn arc on the bearing axis, a drift distance that is a function of the lateral component ($WindSpeed_y$) of the speed of drift of the moving vehicle and of the time ($t_{heading}$) that the moving vehicle would take to cover said arc at a set-point speed (TAS).

9. The device as claimed in claim 2, characterized in that the separation threshold generation means determine a dynamic separation threshold ($MLCD_{DYNAMIC}$) by adding a safety distance (SIDE_MLCD) to the length of the projection (AD) of the avoidance turn arc on the bearing axis.

10. The device as claimed in claim 2, wherein the separation threshold generation means determine a dynamic separation threshold by adding, to the length of the projection of said arc on the bearing axis, a drift distance that is a function of the lateral component of the speed of drift of the moving vehicle and of the time that the moving vehicle would take to cover said arc at a set-point speed, and at a safe distance.

11. A device, for moving vehicles, for signaling lateral maneuver margins comprising:

means for selecting a maneuvering zone on the surface of the Earth, means for taking into account, in the selected maneuvering zone, a first type of risk region comprising regions considered to be uncrossable, separation threshold generation means for generating at least one horizontal separation threshold to be observed relative to the first type of risk region to claim a complete freedom of lateral maneuver, said separation threshold generation means taking into account, in the estimation of a separation threshold for a contour point of a region of the first type, the bearing angle of the contour point concerned seen from the moving vehicle, and means of determining, in the selected maneuvering zone, a second type of risk region made up of regions where the moving vehicle has a restricted lateral maneuvering freedom, said second type of risk region surrounding the first type of risk region over widths at least equal to the separation threshold established by the separation threshold generation means, wherein the separation threshold generation means determine, for each contour point of the regions of the first type in direct sight of the moving vehicle, a dynamic separation threshold taking a value increasing with the bearing angle, relative to the moving vehicle, of the contour point concerned, and wherein the separation threshold generation means determine a static separation threshold ($MLCD_{STATIC}$) valid for all the contour points (P) of the regions of the first type ($Z_{RISK}$), and taken to be equal to the dynamic threshold ($MLCD_{DYNAMIC}$) of a contour point (P) situated at 90 degrees bearing.

12. A device, for moving vehicles, for signaling lateral maneuver margins comprising:
    means for selecting a maneuvering zone on the surface of the Earth,
    means for taking into account, in the selected maneuvering zone, a first type of risk region comprising regions considered to be uncrossable,
    separation threshold generation means for generating at least one horizontal separation threshold to be observed relative to the first type of risk region to claim a complete freedom of lateral maneuver, said separation threshold generation means taking into account, in the estimation of a separation threshold for a contour point of a region of the first type, the bearing angle of the contour point concerned seen from the moving vehicle, and
    means of determining, in the selected maneuvering zone, a second type of risk region made up of regions where the moving vehicle has a restricted lateral maneuvering freedom, said second type of risk region surrounding the first type of risk region over widths at least equal to the separation threshold established by the separation threshold generation means,
    wherein the separation threshold generation means determine a static separation threshold ($MLCD_{STATIC}$) valid for all the contour points (P) of the regions of the first type ($Z_{RISK}$) and greater than or equal to the diameter (2R, 2SIDE_TURN_RADIUS) of an avoidance turn.

13. A device, for moving vehicles, for signaling lateral maneuver margins comprising:
    means for selecting a maneuvering zone on the surface of the Earth,
    means for taking into account, in the selected maneuvering zone, a first type of risk region comprising regions considered to be uncrossable,
    separation threshold generation means for generating at least one horizontal separation threshold to be observed relative to the first type of risk region to claim a complete freedom of lateral maneuver, said separation threshold generation means taking into account, in the estimation of a separation threshold for a contour point of a region of the first type, the bearing angle of the contour point concerned seen from the moving vehicle,
    means of determining, in the selected maneuvering zone, a second type of risk region made up of regions where the moving vehicle has a restricted lateral maneuvering freedom, said second type of risk region surrounding the first type of risk region over widths at least equal to the separation threshold established by the separation threshold generation means:
    means of selecting a maneuvering zone for the moving vehicle on the surface of the Earth,
    means of taking into account, in the selected maneuvering zone, a first type of risk region made up of regions considered as having to be bypassed,
    lateral separation threshold generation means determining a dynamic separation threshold for each contour point of the regions of the first type in direct sight of the moving vehicle, taking into account the bearing angle of the contour point concerned relative to the moving vehicle and a static separation threshold valid for all the contour points of the regions of the first type, greater than or equal to the diameter of the avoidance turn, said dynamic separation thresholds taking values increasing with the absolute value of the bearing angles to a limit value taken to be equal to the static threshold,
    means of determining, in the selected maneuvering zone, a second type of risk region made up of regions where the moving vehicle has a restricted lateral maneuvering freedom, said second type of risk region extending around the first type of risk region and having, in front of the points of the risk regions of the first type in sight of the moving vehicle, widths at least equal to the dynamic separation thresholds supplied by the separation threshold generation means, and
    means of determining, in the selected maneuvering zone, a third type of risk region made up of regions where the moving vehicle can have a restricted lateral maneuvering freedom, said third type of risk region extending around the first type over a width at least equal to the static separation threshold supplied by the separation threshold generation means.

14. The device as claimed in claim 13, for a moving vehicle of the aircraft type equipped with a ground collision prevention system registering contours of potentially dangerous regions, characterized in that the means of taking into account the first type of risk region liken the first type of risk region to the regions signaled as dangerous by the ground collision prevention system.

15. The device as claimed in claim 13, for a moving vehicle of the aircraft type, characterized in that the means of taking into account the first type of risk region ($Z_{RISK}$) liken the first type of risk region ($Z_{RISK}$) to a level cross section of the relief of the selected maneuvering zone, made at a reference altitude (RefAlt) taken to be equal to the minimum of the instantaneous altitude of the aircraft and the altitude of the aircraft that can be predicted in the short or medium term.

16. The device as claimed in claim 13, for a moving vehicle of the aircraft type equipped with a ground collision prevention system registering the contours of potentially dangerous regions, wherein the means of taking into account the first type of risk region liken the first type of risk region to a level cross section of the relief of the selected maneuvering zone, made at a reference altitude taken to be equal:
    if no potentially dangerous regions are signaled by the ground collision prevention system, to at least the instantaneous altitude of the aircraft and the altitude of the aircraft that can be predicted in the short or medium term, and
    if potentially dangerous regions are signaled by the ground collision prevention system, to at least the instantaneous altitude of the aircraft and the altitude that can be predicted in the short or medium term, with, when the instantaneous vertical speed of the aircraft changes from negative to positive, a re-update of the reference altitude to the value of the altitude of the aircraft that can be predicted in the short or medium term when the latter is greater than the reference altitude.

17. The device as claimed in claim 13, further comprising display means showing the selected maneuvering zone in the form of a map of risk zones presenting, in different appearances, the different types of risk region that it takes into account and the part of the selected maneuvering zone that complements these different types.

18. A map for signaling lateral maneuver margins obtained by the device as claimed in claim 13, for a moving vehicle of the aircraft type, wherein it displays on a selected maneuvering zone:

a first type of risk region corresponding to a level cross section of the relief of the selected maneuvering zone taken at a reference altitude that is a function of the instantaneous altitude of the aircraft or of the altitude of the aircraft that can be predicted in the short or medium term, a second type of risk region made up of regions where the moving vehicle has restricted lateral maneuvering freedom, said second type of risk region extending around the first type of risk region and having, in front of the points of the risk regions of the first type in direct sight of the aircraft, widths at least equal to dynamic separation thresholds, a third type of risk region made up of regions where the moving vehicle can have a restricted lateral maneuvering freedom, said third type of risk region extending around the first type over a width at least equal to a static separation threshold greater than the dynamic separation thresholds, and the regions of the maneuvering zone that complement the first, second and third types of risk region, corresponding to regions of lateral maneuvering freedom for the aircraft.

* * * * *